(12) United States Patent
Dylla-Spears et al.

(10) Patent No.: US 12,351,718 B2
(45) Date of Patent: Jul. 8, 2025

(54) ENGINEERED FEEDSTOCKS FOR ADDITIVE MANUFACTURE OF GLASS

(71) Applicant: Lawrence Livermore National Security, LLC, Livermore, CA (US)

(72) Inventors: Rebecca Dylla-Spears, Dublin, CA (US); Theodore F. Baumann, Discovery Bay, CA (US); Eric B. Duoss, Dublin, CA (US); Joshua D. Kuntz, Livermore, CA (US); Robin Miles, San Ramon, CA (US); Du Nguyen, Fremont, CA (US); Christopher Spadaccini, Oakland, CA (US); Tayyab I. Suratwala, Pleasanton, CA (US); Timothy Dexter Yee, Alameda, CA (US); Cheng Zhu, Livermore, CA (US); Cameron David Meyers, Minneapolis, MN (US); Nikola Dudukovic, Hayward, CA (US); Tyler Fears, Pleasanton, CA (US); Fang Qian, Santa Cruz, CA (US); Koroush Sasan, Pleasanton, CA (US); Joel Destino, Omaha, NE (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1591 days.

(21) Appl. No.: 16/212,525

(22) Filed: Dec. 6, 2018

(65) Prior Publication Data
US 2020/0024465 A1    Jan. 23, 2020

Related U.S. Application Data

(63) Continuation-in-part of application No. PCT/US2017/036197, filed on Jun. 6, 2017.
(Continued)

(51) Int. Cl.
*C09D 11/03* (2014.01)
*B33Y 10/00* (2015.01)
(Continued)

(52) U.S. Cl.
CPC .............. *C09D 11/03* (2013.01); *B33Y 10/00* (2014.12); *B33Y 70/00* (2014.12); *C03B 19/01* (2013.01);
(Continued)

(58) Field of Classification Search
CPC ....... C09D 11/03; C09D 11/02; C09D 11/033; B33Y 10/00; B33Y 70/00; B33Y 30/00;
(Continued)

(56) References Cited

U.S. PATENT DOCUMENTS 7,384,680 B2 * 6/2008 Bi .......................... B01J 2/006
428/323
8,991,211 B1 3/2015 Arlotti et al.
(Continued)

FOREIGN PATENT DOCUMENTS

CN      1862289 A     11/2006
CN    109553435 A      4/2019
(Continued)

OTHER PUBLICATIONS

International Search Report and Written Opinion from PCT Application No. PCT/US2019/64882, dated Mar. 2, 2020.
(Continued)

*Primary Examiner* — Vishal V Vasisth
(74) *Attorney, Agent, or Firm* — Zilka-Kotab, P.C.

(57) ABSTRACT

According to one embodiment, a method includes forming a structure by printing an ink, the ink including a glass-forming material, and heat treating the formed structure for converting the glass-forming material to glass. According to
(Continued)

another embodiment, an ink composition includes a glass-forming material and a solvent.

69 Claims, 18 Drawing Sheets

Related U.S. Application Data

(60) Provisional application No. 62/346,228, filed on Jun. 6, 2016.

(51) Int. Cl.
| | |
|---|---|
| *B33Y 70/00* | (2020.01) |
| *C03B 19/01* | (2006.01) |
| *C09D 1/00* | (2006.01) |
| *C09D 11/02* | (2014.01) |
| *C09D 11/033* | (2014.01) |

(52) U.S. Cl.
CPC .............. *C09D 1/00* (2013.01); *C09D 11/02* (2013.01); *C09D 11/033* (2013.01)

(58) Field of Classification Search
CPC ....... C03B 19/01; C03B 19/066; C03B 19/06; B29C 64/106
See application file for complete search history.

(56) References Cited

U.S. PATENT DOCUMENTS

| | | | |
|---|---|---|---|
| 2006/0254316 | A1 | 11/2006 | Leu |
| 2008/0090034 | A1 | 4/2008 | Harrison et al. |
| 2012/0308837 | A1 | 12/2012 | Schlechtriemen et al. |
| 2014/0035423 | A1 | 2/2014 | Veronesi et al. |
| 2014/0346436 | A1* | 11/2014 | Li .................. H01L 21/02625 438/482 |
| 2015/0099102 | A1 | 4/2015 | Sullivan et al. |
| 2016/0009029 | A1 | 1/2016 | Cohen et al. |
| 2016/0368806 | A1 | 12/2016 | Yamaguchi et al. |
| 2018/0118610 | A1 | 5/2018 | Hanawa et al. |
| 2018/0127297 | A1 | 5/2018 | Harrison et al. |
| 2019/0070748 | A1 | 3/2019 | Comte et al. |

FOREIGN PATENT DOCUMENTS

| | | | |
|---|---|---|---|
| EP | 0426363 | A2 | 5/1991 |
| IL | 206989 | A | 1/2015 |
| JP | 2001326002 | A | 11/2001 |
| JP | 2004067456 | A | 3/2004 |
| JP | 2008201665 | A | 9/2008 |
| JP | 2012526291 | A | 10/2012 |
| JP | 2013501701 | A | 1/2013 |
| JP | 2015023560 | A | 2/2015 |
| JP | 2017119591 | A | 7/2017 |
| JP | 2017159644 | A | 9/2017 |
| JP | 2019500491 | A | 1/2019 |
| KR | 20020082776 | A | 10/2002 |
| RU | 2302066 | C1 | 6/2007 |
| RU | 2370464 | C2 | 10/2009 |
| RU | 2463264 | C2 | 10/2012 |
| SU | 65910 | A1 | 11/1945 |
| WO | 2015054411 | A1 | 4/2015 |
| WO | 2015120429 | A1 | 8/2015 |
| WO | 2015130632 | A1 | 9/2015 |
| WO | 2015141779 | A1 | 9/2015 |
| WO | 2016048341 | A1 | 3/2016 |
| WO | 2016208671 | A1 | 12/2016 |
| WO | 2017214179 | A1 | 12/2017 |
| WO | 2019172937 | A1 | 9/2019 |

OTHER PUBLICATIONS

Sasan et al., "Additive Manufacturing of Optical Quality Germania-Silica Glasses," ACS Applied Materials & Interfaces, Jan. 2020, 6 pages.
Cooperstein et al., "Additive Manufacturing of Transparent Silica Glass from Solutions," ACS Applied Materials & Interfaces, May 2018, pp. 18879-18885.
International Preliminary Examination Report from PCT Application No. PCT/US2019/64882, dated Jun. 17, 2021.
International Preliminary Examination Report from PCT Application No. PCT/US2017/036197, dated Dec. 20, 2018.
International Search Report and Written Opinion from PCT Application No. PCT/US2017/036197, dated Aug. 11, 2017.
Klein et al., "3D Printing of Transparent Glass," HP Laboratories, Sep. 2012, 4 pages.
Klein et al., "Additive Manufacturing of Optically Transparent Glass," Mary Ann Liebert, Inc., 2015, pp. 1-39.
Kotz et al., "Glassomer—Processing Fused Silica Glass Like a Polymer," Advanced Materials Nanocomposites, 2018, pp. 1-5.
Kotz et al., "Three-dimensional printing of transparent fused silica glass," Nature, vol. 544, Apr. 20, 2017, 6 pages.
Luo et al., "Additive Manufacturing of Glass," Journal of Manufacturing Science and Engineering, vol. 136, Dec. 2014, pp. 061024-1-061024-6.
Luo et al., "Additive manufacturing of glass for optical applications," 3D Printing Best Paper Award, Laser 3D Manufacturing III, vol. 9738, 2016, pp. 1-9.
Chan et al., "Net shape ceramic microcomponents by modified sol-gel casting," Microsystem Technologies, vol. 6, 2000, pp. 200-204.
Sakka et al., "Glasses from Metal Alcoholates," Journal of Non-Crystalline Solids, vol. 42, 1980, pp. 403-421.
Scherer et al., "Glasses from Colloids," Journal of Non-Crystalline Solids, vol. 63, 1984, pp. 163-172.
Wang et al., "Alumina-doped silica gradient-index (GRIN) lenses by slurry-based three-dimensional printing (S-3DP)," Journal of Non-Crystalline Solids, vol. 349, 2004, pp. 360-367.
Yoldas, B., "Formation of Titania-Silica Glasses by Low Temperature Chemical Polymerization," Journal of Non-Crystalline Solids, vol. 38 & 39, 1980, pp. 81-86.
Mensley, M., "Micron3DP Installs Its First High-Resolution Glass 3D Printer," ALL3DP, Mar. 14, 2017, 7 pages, retrieved from https://all3dp.com/micron3dp-installs-its-first-high-resolution-glass-3d-printer/.
Decision for Rejection Translation from Japanese Application No. 2018-564977, dated Nov. 24, 2021.
Notice of Preliminary Rejection from Korean Patent Application No. 10-2021-7036633, dated Dec. 10, 2021.
Klein et al., "Additive Manufacturing of Optically Transparent Glass," 3D Printing and Additive Manufacturing, vol. 2, No. 3, 2015, pp. 92-105.
Extended European Search Report from European Application No. 17810877.5, dated Dec. 12, 2019.
Marchelli et al., "The guide to glass 3D printing: developments, methods, diagnotsics and results," Rapid Prototyping Journal, vol. 17, No. 3, 2011, pp. 187-194.
Rahaman et al., "Bioactive glass in tissue engineering," Acta Biomaterialia, vol. 7, 2011, pp. 2355-2373.
Tesavibul et al., "Processing of 45S5 Bioglass by lithography-based additive manufacturing," Materials Letters, vol. 74, 2012, pp. 81-84.
Yoldas, B., "Monolithic glass formation by chemical polymerization," Journal of Materials Science, vol. 14, 1979, pp. 1843-1849.
Gonzalez-Oliver et al., "Silica and Silica-Titania Glasses Prepared by the Sol-Gel Process," Journal of Non-Crystalline Solids, vol. 48, 1982, pp. 129-152.
Nguyen et al., "3D-Printed Transparent Glass," Advanced Materials Communication, 2017, 5 pages.
Destino et al., "3D Printed Optical Quality Silica and Silica-Titania Glasses from Sol-Gel Feedstocks," Advanced Materials Technologies, 2018, 10 pages.
Dudukovic et al., "Predicting Nanoparticle Suspension Viscoelasticity for Multimaterial 3D Printing of Silica-Titania Glass," ACS Applied Nano Materials, Jul. 17, 2018, 21 pages.
Office Action from Russian Application No. 2018143304, dated Jun. 26, 2020.

(56) References Cited

OTHER PUBLICATIONS

Office Action from Japanese Patent Application No. 2018-564977, dated Mar. 30, 2021.
Office Action from Korean Patent Application No. 10-2019-7000122, dated Apr. 16, 2021.
Notice of Final Rejection from Korean Patent Application No. 10-2021-7036633, dated Apr. 14, 2022.
Office Action from Indian Application No. 201917000208, dated Oct. 28, 2020.
Extended European Search Report from European Application No. 19891798.1, dated Jul. 21, 2022.
Nommeots-Nomm et al., "Direct ink writing of highly bioactive glasses," Journal of the European Cermamic Society, vol. 38, 2018, pp. 837-844.
Examination Report from European Application No. 17 810 877.5, dated Sep. 14, 2022.
Office Action from Japanese Patent Application No. 2021-532128, dated Sep. 19, 2023.
Office Action from Mexican Patent Application No. MX/a/2018/015084, dated Dec. 4, 2023, 11 pages.
Examination Report from European Application No. 19 891 798.1, dated Feb. 14, 2024, 5 pages.
Examination Report from European Application No. 17 810 877.5, dated Mar. 26, 2024, 9 pages.
Ober et al., "Active mixing of complex fluids at the microscale," Proceedings of the National Academy of Sciences, vol. 112, No. 40, Oct. 6, 2015, pp. 12293-12298.
Decision for Rejection from Japanese Patent Application No. 2021-532128, dated May 28, 2024, 4 pages.
Examination Report from European Application No. 19 891 798.1, dated Nov. 11, 2024.

\* cited by examiner

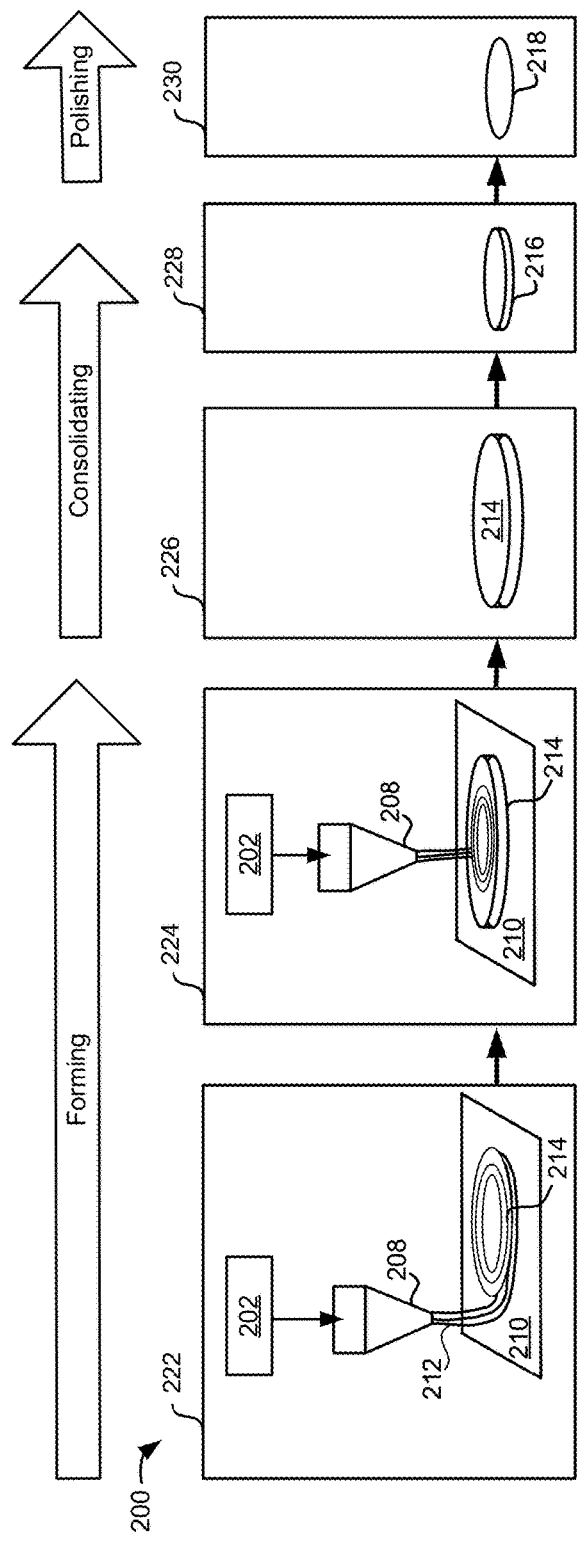
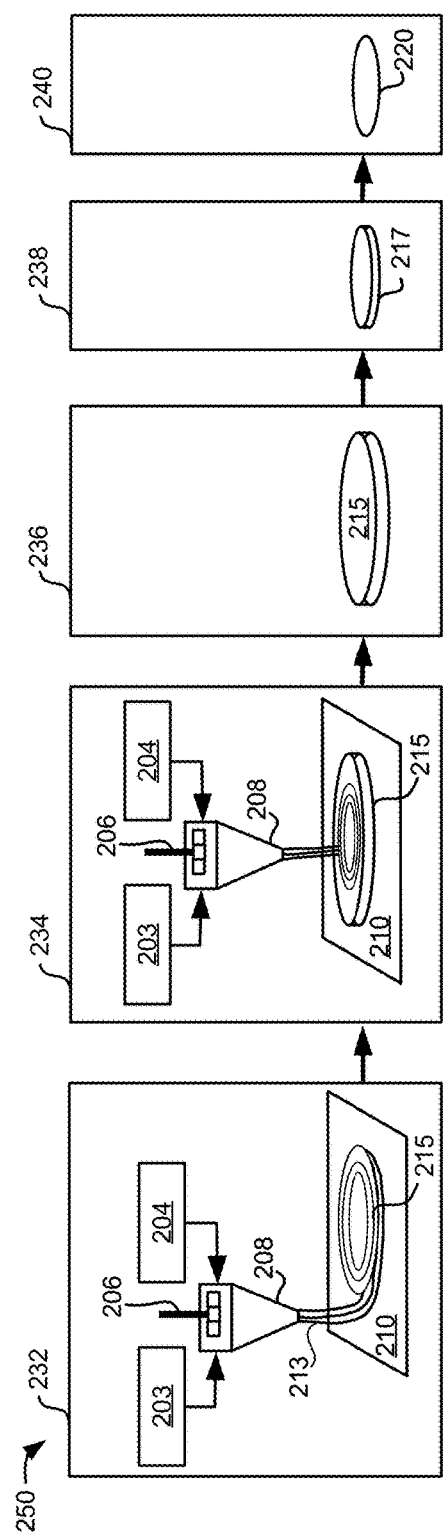
FIG. 2A
FIG. 2B

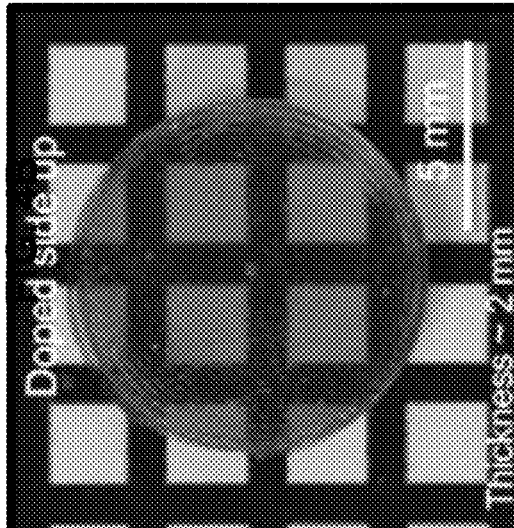
FIG. 5A
FIG. 5B
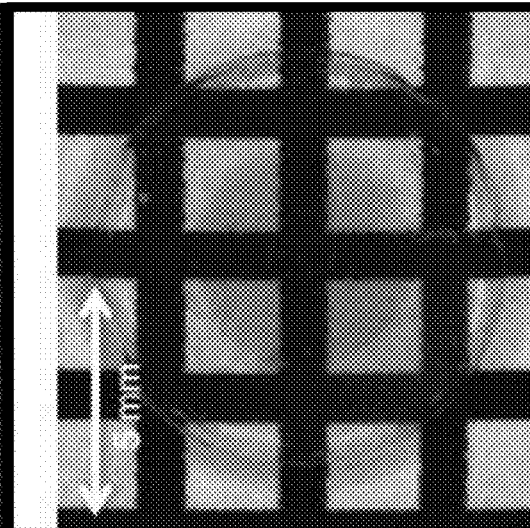
FIG. 5C
FIG. 5D
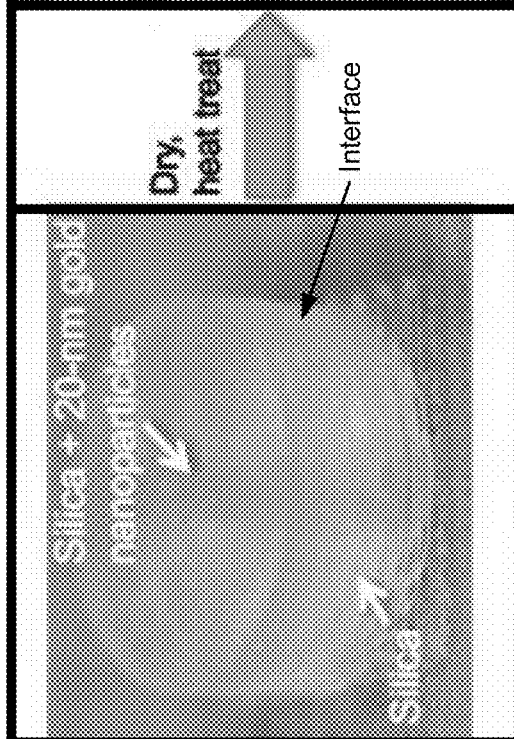
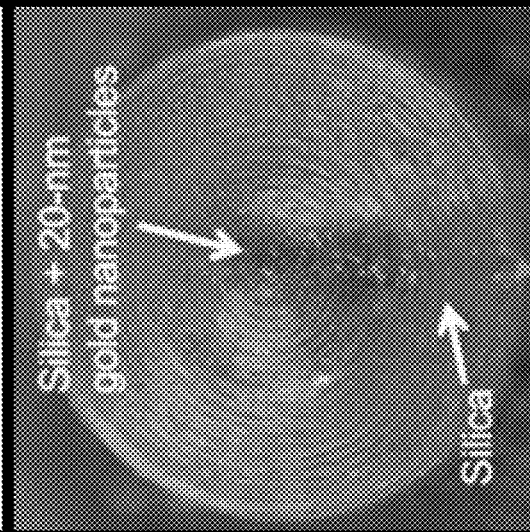

TiO$_2$:SiO$_2$ glasses from inks

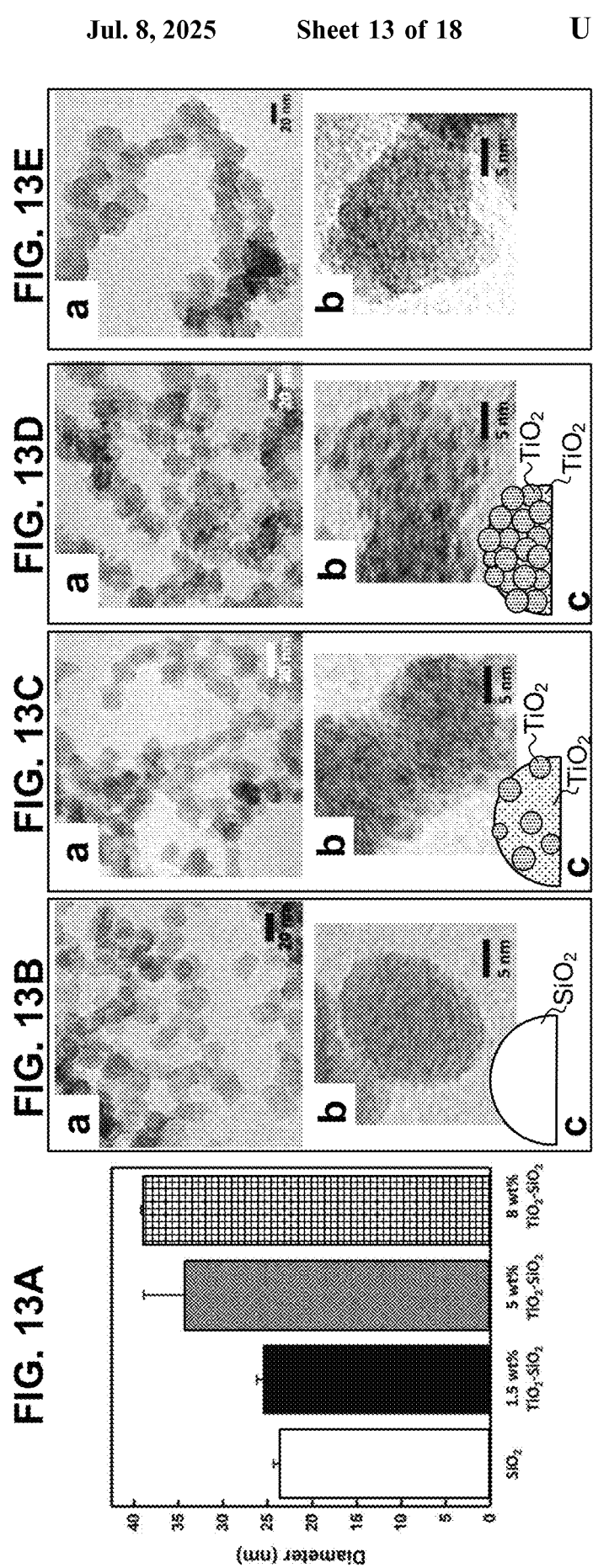

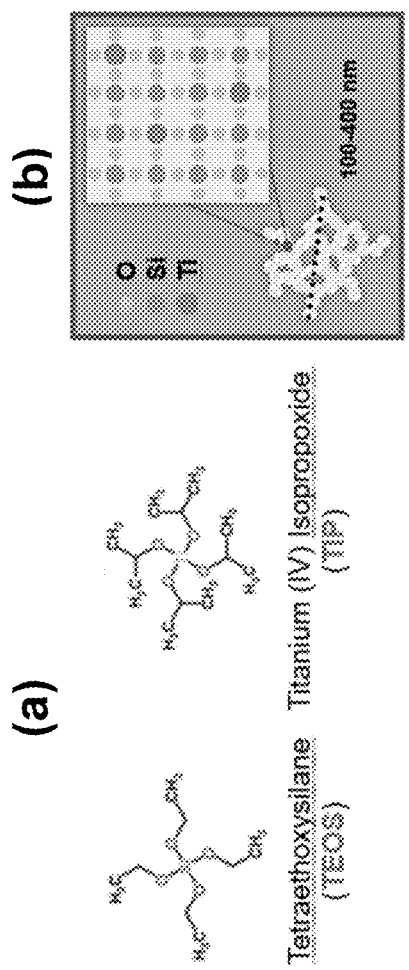
FIG. 15A
FIG. 15B
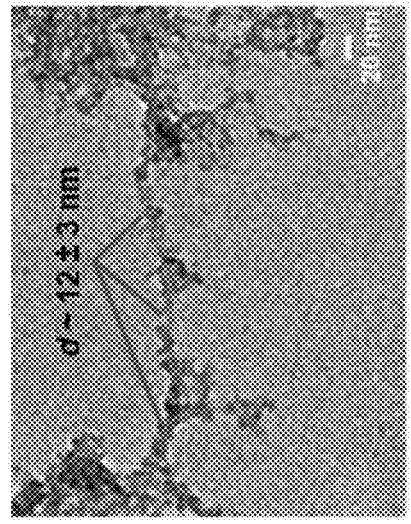
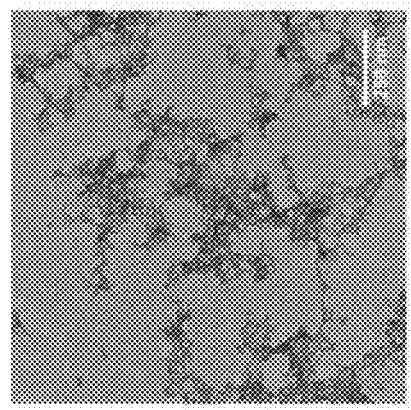
FIG. 15C

ENGINEERED FEEDSTOCKS FOR ADDITIVE MANUFACTURE OF GLASS

This application is a CIP of PCT/US2017/036197 filed Jun. 6, 2017 wherein PCT/US2017/036197 claims priority to a provisional application 62/346,228 filed Jun. 6, 2016.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to glass components, and more particularly, this invention relates optical and non-optical glass components with custom-tailored composition profiles and methods for preparing same.

BACKGROUND

The composition of glass determines its material properties; therefore, hundreds of different commercial glass types exist to serve a multitude of needs. Most glass compositions include 2 or more different oxide species. During the conventional process of melt production of glass, various raw materials of different composition (powders or cullet) are batched together in specific proportions. The materials are blended together first as powders, and then melted in crucibles and mixed thoroughly in a liquid phase to yield the desired final glass composition having a desired homogeneity. The raw materials may include particles of nonspecific sizes, shapes, and varying degrees of agglomeration, and even varying individual compositions. Thus, the individual raw materials may begin to melt at different temperatures (e.g., each melting temperature specific to the individual raw material of the blend), however, the materials remain confined together within the crucible, and are blended together reaching homogeneity in the final melt. Therefore, although highly pure raw materials with low levels of impurities are important for conventional melt glass processing, the characteristics of the raw material in terms of powder size, size uniformity, particle shape(s), chemical distributions, etc. do not determine the optimal processing parameters or optimal material homogeneity.

Moreover, using conventional processes, gradients in glass material compositions are introduced either (1) axially, by fusing together multiple layers containing uniform composition, or (2) radially, by diffusing species (typically small, fast diffusing ions) into or out of rod-shaped silica sol-gels or solids at elevated temperatures. Unfortunately, purely diffusion-based gradients are limited to symmetric, parabolic profiles and have maximum achievable diameters (in the case of radial gradient refractive index lenses) of ~20 mm, with most commercial versions being <2 mm in diameter. Introduction of larger, slower diffusing species proves challenging.

Some attempts have been made to create single-composition glasses via additive manufacturing (AM). Silica glass of a single composition has been prepared via additive manufacturing using the selective laser melting (SLM) to melt and fuse silica particles in a silica powder bed. In addition, glass of a single composition has been prepared via an additive manufacturing method (G3DP) that melts silica in a kiln-like high temperature reservoir and deposits a ribbon of molten glass through a nozzle. These methods leave the filaments or selectively melted regions vulnerable to thermally induced stresses on cooling, which can prevent the part from achieving optical quality, for example, by creating undesirable refractive index gradients across the thickness of the part. Moreover, the selective melted regions may also leave trapped porosity between segments thereby resulting in resistance in merging the segments. In addition, these methods are not amenable to tightly controlled introduction of different compositions. It would be desirable to print and completely form the structure in the absence of high temperature.

In recent studies, AM processes for forming glass have relied on feedstocks such as fumed silica, glass rod stock, and glass powders or cullet produced from melt-processed glasses. Despite a large number of cataloged commercial glasses, only a limited number of glass compositions have been demonstrated using AM techniques. However, many of these glass compositions are not transparent due largely to challenging factors such as the chemical composition and the spatial distribution of the composition. Furthermore, the shape and the form factor of the feedstocks used to produce glass via AM techniques are important for processability of the feedstocks using AM techniques. In addition, the composition, shape and form of the feedstocks determine specific properties of the resulting glass formed from the feedstocks. These factors of the feedstocks may affect yield, transparency, and homogeneity of the glass formed by AM techniques.

Feedstock characteristics become even more important in processes that include multiple feedstocks having multiple compositions that are to be patterned and processed together. Thus, engineering the size, structure, composition, format, and surface properties of the feedstocks is critical to successful glass formation by AM.

Various embodiments described herein use direct ink writing (DIW) additive manufacturing to introduce the composition gradient into an amorphous, low density form (LDF). Following complete formation, the LDF is heat treated to transparency as a whole structure, thus reducing edge effects.

Current methods to form glass of gradient composition have also proven challenging. In a slurry-based 3D printing (S-3DP) system, the dopants are added after the LDF is built from a slurry and dried. This process challenges the structural integrity within the LDF. In addition, the introduction of the dopant in low viscosity droplets over the dried body leaves the potential for the species of interest to diffuse radially and axially and to fill the pores of the dried structure beneath by capillary forces, leading to reduced control over the introduced compositional gradient. Composition gradients may also be limited to material that can incorporate readily into the LDF by diffusion (e.g. small molecules, ions). Thus, it would be desirable to develop a process that forms a glass of gradient composition in which the dopants are a component of the mixture during formation of the LDF and before drying the LDF.

SUMMARY

Various embodiments described herein enable (1) the formation of optical or non-optical glass with custom composition profiles that are not achievable by conventional glass processing techniques, (2) the introduction of species that cannot be introduced easily by diffusion methods, and (3) the creation of glass optics containing custom patterned material properties that are far larger than those achievable by diffusion methods.

Some embodiments described herein introduce a gradient via DIW additive manufacturing and use continuous in-line mixing of glass-forming species, with or without dopant, to achieve the desired composition changes. The LDF is fully formed before drying. The dopant itself can be an ion, molecule, and/or particle, and it may be premixed with the glass-forming species in a high viscosity suspension, which limits its diffusion at low temperature within the LDF.

According to one embodiment, a method includes forming a structure by printing an ink, the ink including a glass-forming material, and heat treating the formed structure for converting the glass-forming material to glass.

According to another embodiment, a product includes a monolithic glass structure having physical characteristics of formation by three dimensional printing of an ink comprising a glass-forming material.

According to yet another embodiment, an ink composition includes a glass-forming material and a solvent. Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic drawing of a method to prepare a single composition glass components, according to one embodiment.

FIG. 2B is a schematic drawing of a method to prepare a multiple composition glass components, according to one embodiment.

FIG. 5A is an image of a low density form with a gradient in the axial direction following multiple component printing, according to one embodiment.

FIG. 5B is an image of a glass form with a gradient in the axial direction following heat treatment of a printed low density form, according to one embodiment.

FIG. 5C is an image of a low density form with a gradient in the radial direction following multiple component printing, according to one embodiment.

FIG. 5D is an image of a glass form with a gradient in the radial direction following heat treatment of a printed low density form, according to one embodiment.

FIG. 13A is a plot of average diameter of particle preparations as measured by determined by dynamic light scattering (DLS) methods.

FIG. 13B includes a lower magnification, part (a), and higher magnification, part (b) of transmission electron microscope (TEM) images of core particle, according to one embodiment.

FIG. 13B part (c) is a schematic drawing of a core particle, according to one embodiment.

FIG. 13C includes a lower magnification, part (a), and higher magnification, part (b) of transmission electron microscope (TEM) images of core-shell particle, according to one embodiment.

FIG. 13C part (c) is a schematic drawing of a core-shell particle, according to one embodiment.

FIG. 13D includes a lower magnification, part (a), and higher magnification, part (b) of transmission electron microscope (TEM) images of core-shell particle, according to one embodiment.

FIG. 13D part (c) is a schematic drawing of a core-shell particle, according to one embodiment.

FIG. 13E includes a lower magnification, part (a), and higher magnification, part (b) of transmission electron microscope (TEM) images of core-shell particle, according to one embodiment.

FIG. 15A part (a) is a schematic drawing of molecular precursors included in an intermixed hybrid particle preparation, according to one embodiment.

FIG. 15A part (b) is a schematic drawing of an intermixed hybrid particle, according to one embodiment.

FIG. 15B is an image of a vial of an intermixed hybrid particle preparation in suspension, according to one embodiment.

FIG. 15C includes a lower magnification, part (a), and higher magnification, part (b) of transmission electron microscope (TEM) images of intermixed hybrid particles, according to one embodiment.

FIG. 16B part (b) is an image of glass product formed from inorganic polymer feedstocks, according to one embodiment.

FIG. 16B part (c) is an image of a calcined product from an inorganic polymer feedstock, according to one embodiment.

DETAILED DESCRIPTION

Figure 1:
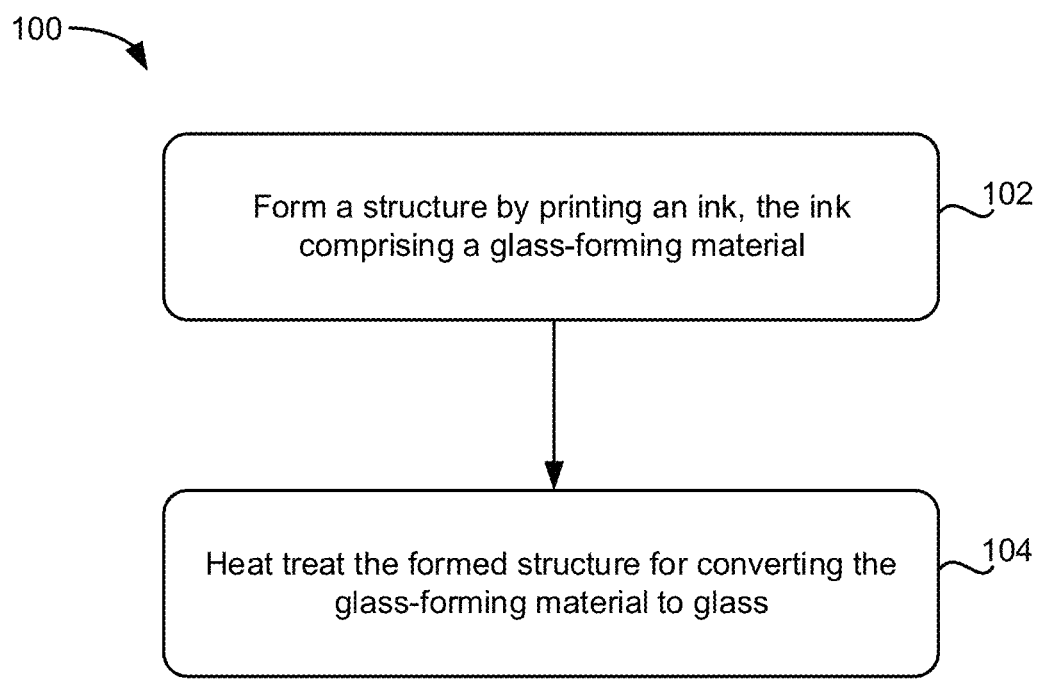
FIG. 1 is a flow chart of a method to prepare glass components with custom-tailored composition profiles, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of preparing optical and non-optical glass components with custom-tailored composition profiles, and/or related systems and methods.

In one general embodiment, a method includes forming a structure by printing an ink, the ink including a glass-forming material, and heat treating the formed structure for converting the glass-forming material to glass.

In another general embodiment, a product includes a monolithic glass structure having physical characteristics of formation by three dimensional printing of an ink comprising a glass-forming material.

In yet another general embodiment, an ink composition includes a glass-forming material and a solvent.

A list of acronyms used in the description is provided below.
3D Three dimensional
DIW Direct ink write
DLS Dynamic Light Scattering
EDX Energy Dispersive X-ray
FDM Fused deposition modeling
IR Infrared
G3DP Glass three dimensional printing
GRIN Gradient index glass
LDF Low density form
Si Silicon
S-3DP Slurry-based three dimensional printing
SLM Selective laser melting
TEM Transmission electron microscopy
Ti Titanium
TIP Titanium (IV) isopropoxide
UV Ultraviolet In sharp contrast to materials used to form glass by conventional processing techniques, physical and chemical properties of the raw materials used to form glass by additive manufacturing (AM) techniques are critical to determine optimal processing parameters and optimal material homogeneity. For example, during AM processing, raw material is deposited in small regions or layer-by-layer, rather than prepared in a bulk batch. Further, the material is mixed prior to a heating stage (e.g., the molten mixing in the crucible during conventional processes), to help ensure a high degree of chemical uniformity. Thus, the spatial distribution of the composition, the shape, and the form factor of the feedstocks used to produce glass via AM techniques are important for the ultimate processability using AM techniques. For example, the shapes and sizes of the particles, as well as the size distribution, determine the physical properties of the feedstocks, e.g., how the particles pack, flow, or spread. In addition, it is important to understand whether the physical properties of the feedstocks are affected if the material is a solid powder or distributed in a solvent or resin.

Regularity in sizes and shapes of particles also influences the consistency and reliability of the AM process. In addition, the void sizes (space between particles) control the temperature at which material of a fixed composition can be sintered via viscous flow. Both the particle surface chemistry and the particle size influence the achievable solids loading at a given viscosity in a resin, paste, or solvent, which also affects the degree to which the components will shrink, potentially affecting yield. Further, the particle size and chemical distribution within the glass-forming species controls the diffusion distance that must be spanned. If the distance is too large, it will lead to poor homogeneity, phase separation, and/or crystallization. These feedstock characteristics become even more important if multiple glass compositions are to be patterned together and simultaneously processed. Thus, engineering the size, structure, composition, format, and surface properties of the feedstocks is critical to successful glass formation by AM. Unfortunately, it very difficult to control many of these features when crushing or milling glass produced from the melt.

Current AM processes for forming glass rely on feedstocks such as fumed silica or glass powders or cullet produced from melt-processed glasses, sometimes also including a dopant such as a salt or other dissolved species to alter the composition. Yet, despite the hundreds of cataloged commercial glasses, only a few glass compositions (mostly silica) have been demonstrated using AM techniques and even fewer attempts have produced transparent glass. Although additional glass compositions have been demonstrated using sol gel chemistry in conjunction with casting/molding processes, these formulations were not specifically engineered or designed to meet the demands of AM processing techniques, where material is deposited (and structure is formed) layer by layer.

Various embodiments described herein provide methods for fabricating active or passive optical or non-optical glass components and/or glass sensors with custom material composition profiles in 1-, 2-, or 3-dimensions. Various embodiments described herein enable the three dimensional (3D) printing of a variety of inorganic glasses, with or without compositional changes. Depending on glass composition and processing conditions, the glasses may appear either transparent or opaque to the human eye. However, the term "optical glass" does not refer only to glasses useful in the visible portion of the spectrum, but may also be extended to UV, visible, near-IR, mid-IR, and far-IR.

FIG. 1 shows a method 100 for preparing optical glass components with custom-tailored composition profiles in accordance with one embodiment. As an option, the present method 100 may be implemented to devices such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

In one embodiment as shown in FIG. 1, a method 100 begins with an operation 102 that includes forming a structure by printing an ink. According to various embodiments, printing an ink may involve one of the following additive manufacturing techniques that may have an ink mixing capability: direct ink writing (DIW), stereolithography in 3D systems, projection micro stereolithography, fused deposition modeling, electrophoretic deposition, PolyJet processing, Direct Deposition, inkjet printing, inkjet powder bed printing, aerosol jet printing, etc. One could imagine combining these processes as well.

According to various embodiments, the method 100 may be used to create filaments, films, and/or 3D monolithic or spanning free-forms.

According to one embodiment, the ink includes a glass-forming material. According to another embodiment, the glass-forming material includes prepared dispersions of particles, where the particles range in size from nanometers to microns. In some approaches, particles may be mono-dispersed. In other approaches, particles may be poly-dispersed. In another approach, particles may be agglomerated.

In another embodiment, the glass-forming material may be a single composition of inorganic particles, for example, but not limited to, fumed silica, colloidal silica, LUDOX colloidal silica dispersion, titania particles, zirconia particles, alumina particles, metal chalcogenide particles (e.g. CdS, CdSe, ZnS, PbS), etc. In yet other embodiments, the glass-forming material may be a single composition of inorganic-containing particles.

In one embodiment, the glass-forming material may be a plurality of a mixed composition particle, for example, but not limited to, a binary silica-titania particle, silica-germanium oxide particle, and/or may be a particle with an inorganic or organic chemically modified surface (i.e. titania-modified silica particles; silica-modified titania particles; 3-aminopropyltriethoxysilane modified silica particles).

In some embodiments, the glass-forming material may be a mixture of particles of different compositions, for example but not limited to, a silica particle plus titania particle mixture that when fused together forms silica-titania glass.

According to one embodiment, the glass-forming material may be a single composition of glass-forming material that may not be in the form of particles. In some embodiments, a dopant may be directly incorporated into polymers, for example but not limited to, silica, silica-titania containing polymers, silica-germanium oxide polymers, silica-aluminum oxide polymers, silica-boron trioxide polymers, etc.

According to some embodiments the glass-forming material of the ink may include large molecules and/or polymers (linear or branched) prepared from smaller metal-containing organic precursors. Examples of polymers include poly(dimethylsiloxane), silicones, diethoxysiloxane-ethyltitanate copolymer, polyhedral oligomeric silsesquioxane polymers and copolymers. Examples of large molecules include polyoxometalate clusters, oxoalkoxometalate clusters. Designer Si/Ti containing polymers may be synthesized via acid-catalyzed hydrolysis of organosilicates and organotitanates, e.g., tetraethylorthosilicate and titanium isopropoxide, with additional transesterification steps if necessary. Modifications to this process include: utilizing organometallic chemistries containing bonds other than metal-oxygen, e.g., (3-aminopropyl)triethoxysilane; doping via direct addition of salts to the polymer solution, e.g., NaF, $Cu(NO_3)_2$, $Li_2CO_3$; doping via inclusion of metal species into polymer chain during acid-catalyzed hydrolysis; replacement of major (for example, silicon (Si)), and minor (for example titanium (Ti)) glass components with alternatives that are able to undergo linear polymerization, e.g., Ge, Zr, V, Fe.

According to some embodiments the glass-forming material of the ink may include small metal-containing organic precursors and/or inorganic precursors, such as metalalkoxides, siloxanes, silicates, phosphates, chalcogenides, metalhydroxides, metal salts, etc. Examples may include silicon alkoxides, boron alkoxides, titanium alkoxides, germanium alkoxides. In some approaches, the glass-forming material of the ink may include titanium isopropoxide, titanium diisopropoxide bis(acetylacetonate), tetraethyl orthosilicate, zinc chloride, titanium chloride.

In one embodiment, the glass-forming material may be suspended in a solvent. In one embodiment in which the glass-forming material is a polar and/or hydrophilic glass-forming material, the solvent is preferably a polar, aprotic solvent. In one approach, the solvent may be a pure component or mixture of the following: propylene carbonate, dimethyl ethers (e.g. tetra (ethylene glycol) dimethyl ether), and/or dimethylformamide. In another approach, the solvent may be a polar, protic solvent, for example, alcohol and/or water. In one embodiment in which the glass-forming material is hydrophobic, the solvent may be a non-polar solvent, for example, but not limited to, xylenes, alkanes.

According to one embodiment, the ink may be a combination of the glass-forming material and at least one second component that alters a property of the heat treated glass structure. In some embodiments, the second component may be a property altering dopant. In other embodiments, more than one material property may be affected by the addition of a second component. In various embodiments, the second component may affect the material property (e.g. characteristics) of the resulting structure in terms of one or more of the following: optical, mechanical, magnetic, thermal, electrical, chemical characteristics, etc.

In one approach, the second component may be in the form of ions. In another approach, the second component may be molecules. In yet another approach, the second component may be particles.

In some embodiments, the ink may contain an effective amount of one or more second components that may alter a property of the heat treated glass structure. The effective amount of a second component is an amount that alters a property of the heat treated glass structure may be readily determined without undue experimentation following the teachings herein and varying the concentration of the additive, as would become apparent to one skilled in the art upon reading the present description.

In one embodiment, the color of the resulting structure may be affected by the addition of one or more second components selected from the following group: metal nanoparticles (gold, silver) of various sizes, sulfur, metal sulfides (cadmium sulfide), metal chlorides (gold chloride), metal oxides (copper oxides, iron oxides).

In one embodiment, the absorptivity (linear or nonlinear) of the resulting structure may be affected by the addition of a one or more second components selected from the following group: cerium oxide, iron, copper, chromium, silver, and gold.

In one embodiment, the refractive index of the resulting structure may be affected by the addition of one or more second components selected from the following group: titanium, zirconium, aluminum, lead, thorium, barium.

In one embodiment, the dispersion of the resulting structure may be affected by the addition of one or more second components selected from the following group: barium, thorium.

In one embodiment, the attenuation/optical density of the resulting structure may be affected by the addition of one or more second components selected from the following group: alkaline metals and alkaline earth metals.

In one embodiment, the photosensitivity of the resulting structure may be affected by the addition of one or more second components selected from the following group: silver, cerium, fluorine.

In one embodiment, the electrical conductivity of the resulting structure may be affected by the addition of one or more second components selected from the following group: alkali metal ions, fluorine, carbon nanotubes.

In one embodiment, the birefringence, such as having a refractive index that depends on polarization and propagation direction of light imparted by the crystalline phase formed from the second component, of the resulting structure may be affected by the addition of one or more second components selected from the following group: titanium, zirconium, zinc, niobium, strontium, lithium, in combination with silicon and oxygen.

In one embodiment, the thermal conductivity of the resulting structure may be affected by the addition of one or more second components selected from the following group: carbon nanotubes, metals.

In one embodiment, the thermal emissivity of the resulting structure may be affected by the addition of one or more second components selected from the following group: tin oxide, iron.

In one embodiment, the thermal expansion of the resulting structure may be affected by the addition of a one or more second components selected from the following group: boron oxide, titanium oxide.

In one embodiment, the glass transition temperature of the resulting structure may be affected by the addition of sodium carbonate as the second component.

In one embodiment, the melting point of the resulting structure may be affected by the addition of one or more second components selected from the following group: sodium, aluminum, lead.

In one embodiment, the gain coefficient of the resulting structure may be affected by the addition of one or more second components selected from the following group: rare earth ions (e.g. neodymium, erbium, ytterbium); transition metal ions (e.g. chromium).

In one embodiment, the photoemission of the resulting structure may be affected by the addition of a second component. In another embodiment, the luminescence of the resulting structure may be affected by the addition of a second component. In yet another embodiment, the fluorescence of the resulting structure may be affected by the addition of a second component.

In one embodiment, the chemical reactivity of the resulting structure may be affected by the addition of one or more second components selected from the following group: alkaline metals, alkaline earth metals, silver.

In one embodiment, the density of the resulting structure may be affected by the addition of one or more second components selected from the following group: titanium, zirconium, aluminum, lead, thorium, barium.

In one embodiment, the concentration of the second component in the ink may change during the printing for creating a compositional gradient in the printed structure. In some approaches, the second component in the ink may create a compositional gradient in the final heat treated structure.

In some embodiments, the concentration of the second component in the ink may create a compositional change (e.g. gradient, pattern, etc.) that may not be symmetrical about any axis, for example but not limited to, a pattern may change radially around the structure, a pattern may be formed as a complete 3D structure, etc.).

In some embodiments, the ink may contain an effective amount of one or more additional additives that may perform specific functions. For example, but not limited to, the additives may enhance dispersion, phase stability, and/or network strength; control and/or change pH; modify rheology; reduce crack formation during drying; aid in sintering; etc. The effective amount of an additive is an amount that imparts the desired function or result, and may be readily determined without undue experimentation following the teachings herein and varying the concentration of the additive, as would become apparent to one skilled in the art upon reading the present description.

In one embodiment, the ink may include one or more of the following additives to enhance dispersion: surfactants (e.g. 2-[2-(2-methoxyethoxy)ethoxy]acetic acid (MEEAA)), polyelectrolytes (e.g. polyacrylic acid), inorganic acids (e.g. citric acid, ascorbic acid).

In one embodiment, the ink may include an additive (e.g. boric anhydride ($B_2O_3$)) to enhance phase stabilization (i.e. to prevent phase/composition separation, which may or may not be a crystalline phase separation). Another example is ZnO, which can act as a phase stabilizer for alkali silicate.

In one embodiment, the ink may include an additive (e.g. boric anhydride $B_2O_3$) to inhibit crystallization. Other crystallization inhibitors include $Al_2O_3$ and $Ga_2O_3$.

In one embodiment, the ink may include an additive (e.g. polydimethylsiloxanes) to strengthen the network.

In one embodiment, the ink may include one or more of the following additives to control pH: organic acids, inorganic acids, bases (e.g. acetic acid, HCl, KOH, $NH_4OH$).

In one embodiment, the ink may include one or more of the following additives to modify rheology: polymers (e.g. cellulose, polyethylene glycols, poly vinyl alcohols); surfactants (e.g. MEEAA, sodium dodecyl sulfate, glycerol, ethylene glycol); metal alkoxides (e.g. titanium diisopropoxide bis(acetylacetonate)).

In one embodiment, the ink may include one or more of the following additives as a drying aid to increase resistance to cracking and/or reduce crack formation during drying: polymers (e.g. polyethylene glycol, polyacrylates), crosslinkable monomers or polymers and crosslinking reagents (e.g. polyethylene glycol diacrylate (PEGDA)).

In one embodiment, the ink may include an additive as a sintering aid. Sintering aids enhance the sintering/densification process. In the case of glass, a sintering aid may lower the viscosity of the material being sintered to glass. For example, boric anhydride ($B_2O_3$) may be included as a sintering aid.

In various embodiments, the formulation of glass-forming ink (i.e. glass-forming material) is optimized for the following combination of factors: printability (depending on the method of 3D printing), resistance to cracking, and sintering to transparency. In some approaches, volumetric loading of the formulation of glass-forming ink is optimized. In some approaches, the characteristics of the composition gradient of the glass-forming material may be optimized.

According to one embodiment, a formulation of glass-forming material may include: glass-forming, inorganic species in the range of about 5 vol % to about 50 vol % of total volume; solvent in the range of about 30 vol % to about 95 vol %; a second component(s) (i.e. dopants) in the range of 0 wt % to about 20 wt %; and an additive(s) from 0 wt % to about 10 wt %.

Example Formulation 1 of Ink

| | |
|---|---|
| 5-15 vol % | Fumed Silica (Cabosil EH-5 or Cabosil OX-50) |
| 30-95 vol % | Tetraethylene glycol dimethyl ether |
| 0-20 wt % | Titanium diisopropixide bis(acetylacetonate) |
| 0-6 wt % | Ethylene glycol |
| 0-2 wt % | Poly(dimethylsiloxane) |

Example Formulation 2 of Ink

| | |
|---|---|
| 75-95 vol % | Silica-titania-containing polymers |
| 10-25 vol % | Tetraethylene glycol dimethyl ether |
| 0-10 vol % | $H_2O$ for prehydrolysis |

Example Formulation 3 of Ink

| | |
|---|---|
| 5-20 vol % | 25-nm titania-coated silica particles |
| 25-45 vol % | Propylene carbonate |
| 25-45 vol % | Tetraethylene glycol dimethyl ether |
| 0-5 wt % | MEEAA |

According to one embodiment, the concentration of the second component in the ink may change during the printing for creating a compositional gradient in the structure and thus, the final heat treated structure.

In one embodiment, the temperature of the ink may be less than about 200° C. during the printing.

In one embodiment, the method 100 includes drying the formed structure for removing a sacrificial material, where the drying is done prior to heat treating the formed structure. Ideally, the fully formed structure is dried in a single process.

According to one embodiment as shown in FIG. 1, method 100 includes operation 104 that involves heat treating the formed structure for converting the glass-forming material to glass.

In one embodiment, the method includes additional processing of the heat-treated glass structure. In one approach, the method includes grinding the heat-treated glass structure. In another approach, the method includes polishing the heat-treated glass structure. In yet another approach the method includes grinding and polishing the heat-treated glass structure.

In one embodiment, the heat-treated glass structure may be in the form of a fiber.

In another embodiment, the heat-treated glass structure may be in the form of a sheet.

In one embodiment, the heat-treated glass structure may be in the form of a three-dimensional monolith.

In another embodiment, the heat-treated glass structure may be in the form of a coating on a substrate such as a part, a tool, etc.

FIGS. 2A-2B depict methods 200 and 250 for preparing an optical glass component with custom-tailored composition profiles in accordance with one embodiment. As an option, the present methods 200 and 250 may be implemented in conjunction with features from any other embodiment listed herein, such as those described with reference to the other FIGS. Of course, however, such methods 200 and 250 and others presented herein may be used in various applications and/or in permutations which may or may not be specifically described in the illustrative embodiments listed herein. Further, the methods 200 and 250 presented herein may be used in any desired environment.

An exemplary embodiment of method 200 to prepare a single component silica glass is illustrated in FIG. 2A. According to one embodiment, the method to print the ink involves DIW printing as shown in steps 222 and 224. DIW is a 3D printing process based on extrusion of viscoelastic material. Air pressure or positive displacement pushes the ink 202 through a small nozzle 208. In some approaches, the nozzle 208 is controlled by a computer and has three degrees of freedom (x, y, and z). In other approaches the nozzle 208 may be expanded to have six axes for printing. The nozzle 208 may be positioned to extrude the ink in a controlled spatial pattern.

In steps 222 and 224, DIW deposits filaments 212 of rheologically tuned glass-forming DIW ink 202 containing glass-forming species in a prescribed geometry to create a weakly associated, near net-shaped, porous amorphous low density form (LDF) 214. In some approaches, there is rapid solidification of the extruded filament 212 into the LDF 214. In some approaches, the LDF 214 may be referred to as a green body, glass-forming species, etc. The glass-forming species may be introduced as either precursors and/or as colloids/particles. In some approaches, the glass-forming DIW ink 202 may be colloidal silica ink.

According to one embodiment, the formulation of the glass-forming DIW ink is optimized for printability, drying/bakeout, and sintering. The formulation of the glass-forming DIW ink may be optimized for printability in terms of shear thinning, ability to flow (steady flow), ability to hold shape (shape retention), low agglomeration, long print time, stable pot life (stability), etc. The formulation of the glass-forming DIW ink may be optimized for drying in terms of robustness to handling, crack resistance, low/uniform shrinkage, porosity suited to organic removal, etc. The formulation of the glass-forming DIW ink may be optimized for sintering in terms of crack resistance, low/uniform shrinkage, able to densify/become transparent, low tendency to phase separate, etc.

According to one embodiment, step 222 involves the glass-forming DIW ink 202 extruded through a nozzle 208 to deposit filaments 212 onto a substrate 210 in a single layer.

Figures 3A, 3B, 3C:
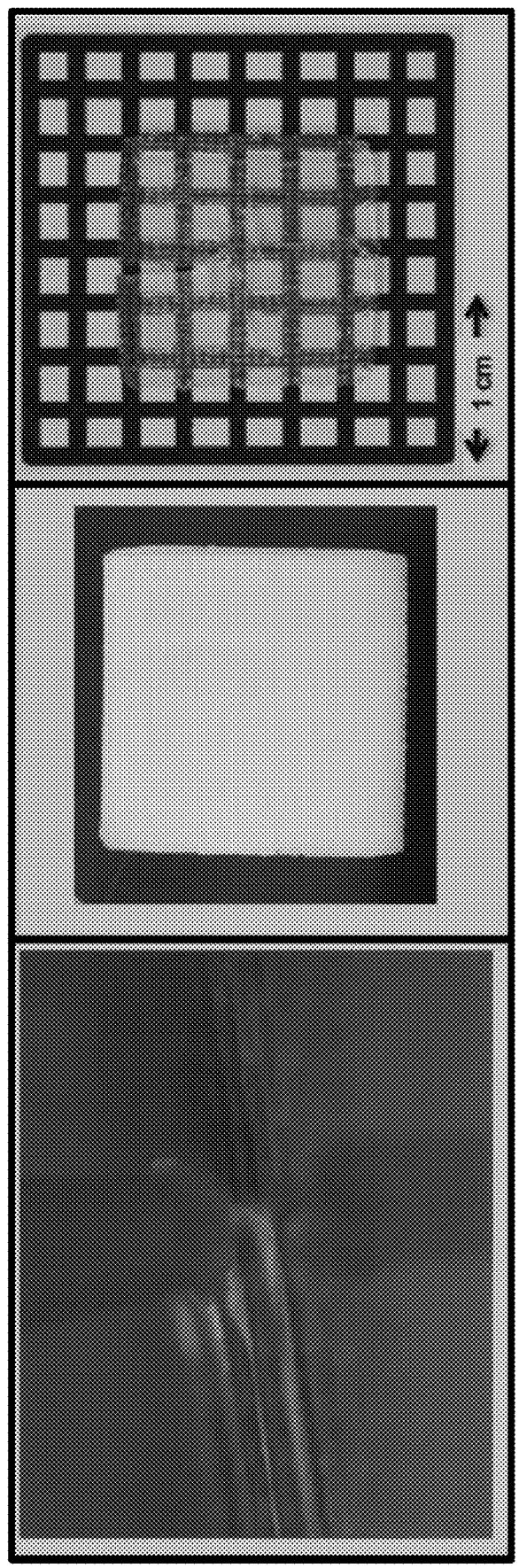
FIG. 3A is an image of an extrusion of glass-forming ink onto a substrate, according to one embodiment.
FIG. 3B is an image of a printed low density form, according to one embodiment.
FIG. 3C is an image of a glass form following heat treatment of a printed low density form, according to one embodiment.

Step 224 of method 200 involves building layer upon layer of glass-forming DIW ink 202 to form a LDF 214. FIG. 3A shows an image of the colloidal silica ink being extruded onto the substrate.

The LDF 214 may be treated to multiple steps to consolidate and convert the LDF 214 to the heat-treated glass form 216.

Optionally, the LDF 214, either before or after drying, may undergo additional processing to further change the composition of the part. In some approaches, additional processing may include diffusion, leaching, etching, etc. In other approaches, additional processing may include light, sound, vibration to alter the characteristics of the printed form, or a combination thereof. In yet other approaches, a chemical treatment before closing the porosity of the LDF by heat treatment may define the optical quality of the resulting glass form.

In step 226, the LDF may be dried, calcined (i.e. removal of residual solvents/organics at elevated temperature), etc. During drying, the liquid/solvent phase may be removed. The LDF 214 may be released from the substrate 210 on which the LDF 214 was printed. In some approaches, the drying step 226 may involve dwelling hours to weeks at temperatures below the boiling point of the solvent. In some embodiments, a processing step 226 may involve a lower heating step (i.e. burnout) to remove organics as well as any residual and/or adsorbed water/solvent phase. In some approaches, the burnout step may involve dwelling 0.5 to 24 hours at 250-600° C.

In some embodiments, the processing step 226 may include heating the LDF 214 under alternate gas atmospheres for chemically converting the surface (e.g. conversion of free surface hydroxyls to dehydrated siloxanes). In some approaches, the processing step 226 may include heating the LDF 214 under oxidative gas atmospheres (e.g. $O_2$ gas). In other approaches, the processing step 226 may include heating the LDF 214 under reducing gas atmospheres (e.g. $H_2$ gas). In yet other approaches, the processing step 226 may include heating the LDF 214 under non-reactive gas atmospheres (e.g. Ar, He). In yet other approaches, the processing step 226 may include heating the LDF 214 under reactive gas atmospheres (e.g. $N_2$, $Cl_2$). In yet other approaches, the processing step 226 may include heating the LDF 214 under vacuum.

In some embodiments, the processing step 226 may also include compacting the parts (i.e. reducing porosity) of the LDF 214 using uniaxial pressure or isostatic pressure thereby resulting in a compact form. In some approaches, the processing step 226 may also include compacting the parts (i.e. reducing porosity) of the LDF 214 under vacuum.

FIG. 3B shows an image of a LDF that has been dried.

According to one embodiment, the method involves heat treating the dried LDF 214, as shown in step 228 of FIG. 2A, to close the remaining porosity and form a consolidated, transparent glass part. In some approaches, a compact form of the LDF may be heat treated.

The heat treating step 228 may involve sintering, in which the LDF 214 (i.e. inorganic, glass-forming species) completely densifies into a solid glass consolidated form 216 at elevated temperatures. In some approaches, sintering the LDF may involve dwelling minutes to hours at 500-1600° C. The temperature for sintering depends on material composition and initial inorganic loading and porosity of the LDF. In some approaches, the sintering of the LDF may involve simultaneous use of applied pressure. In some approaches, the heat treating step 228 may occur under different atmospheric conditions. In other approaches, the heat treating step 228 may occur under vacuum.

In some embodiments, the heat treated glass form 216 may be a monolithic glass structure. FIG. 3C shows an image of a monolithic glass structure after heat treatment of the LDF shown in FIG. 3B. In some embodiments, the resultant glass consolidated form 216 may retain the characteristics of the ink 202 that may have been imparted during DIW printing (steps 222 224).

In one embodiment, the glass consolidated form 216 may have a physical characteristic of the LDF 214 including spiral-shaped, arcuate and/or straight ridges along one surface of the glass form 216.

In one embodiment, in the post-processing step 230, the glass form 216 may be post-processed, for example to achieve the desired figure and/or surface finish of a final polished optic form 218 through techniques such as grinding and/or polishing. In one embodiment, the polished optic 218 is a polished formation by 3D printing and heat treatment, such that the properties of the LDF 214 remain and are not removed by polishing. In one embodiment, the polished optic 218 is a monolithic glass structure that has been polished.

In some approaches, the glass form 216 may be treated as bolt glass, thereby allowing removal any of the evidence of the printing process by conventional techniques known in the art. In other approaches, the glass form 216 retains features achievable only by the printing processes described herein, even after post-processing.

According to one embodiment, a schematic representation of a method 250 to form a gradient and/or a spatial pattern in a glass product is illustrated in FIG. 2B. In other embodiments, the method may create a compositional change (e.g. gradient, pattern, etc.) that may not be symmetrical about any axis, for example but not limited to, a pattern may change radially around the structure, a pattern may be formed as a complete 3D structure, etc.).

In one approach, the method may form a gradient index (GRIN) glass. Printing a GRIN glass involves printing a monolith with no porosity in which the characteristics of the formation of the LDF result in favorable elastic modulus/viscosity as indicated by space filling, high aspect ratio, and spanning. In addition, the method may involve matching the rheology of the two DIW inks desired to create the gradient. In some embodiments, two, three, four, etc. inks may be combined by mixing before extrusion of the filament onto the substrate.

According to one embodiment, during DIW printing, steps 232, 234, the filament composition 213 may be tuned during printing by adjusting the flow rates of separate streams to introduce desired composition changes within the LDF 214 at the desired locations.

In some approaches, different inks 203, 204 may be introduced separately to create the LDF 215. As shown illustrated in a schematic representation of a side view in FIG. 4A, in one approach, a monolithic glass structure 400 with the physical characteristics of formation by 3D printing (LDF 215 of FIG. 2B) may include a gradient in a refractory index of the monolithic glass structure 400 along an axial direction of the monolithic glass structure 400. The axial 408 direction is perpendicular to the plane 410 of deposition.

Looking back to FIG. 2B, the glass structure is formed as a LDF (LDF 215 in FIG. 2B) in which a first glass-forming ink 203 may be extruded followed by extrusion of a second glass-forming ink 204. The resulting glass structure 400 in FIG. 4A has a first glass 403 and a second glass 404, from the first glass-forming ink 203 and second glass-forming ink 204, respectively.

Figure 4A:
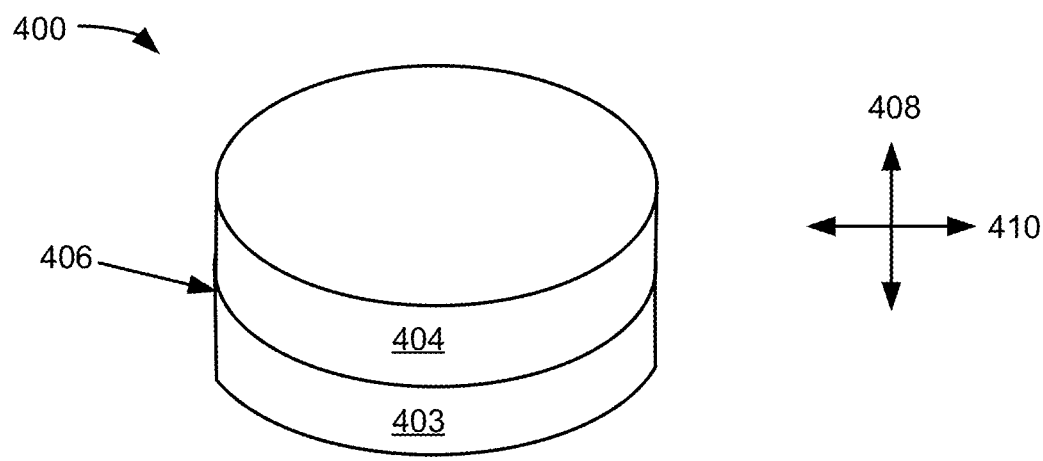
FIG. 4A is a schematic drawing of a low density form that includes a gradient in a material property of the low density form along an axial direction, according to one embodiment.

Moreover, the resulting glass structure 400 of FIG. 4A may include an interface 406 between first glass 403 formed from the glass-forming material and second glass 404 formed from a second glass-forming material having a different composition than the glass-forming material. In some approaches, there may be no intermixing of the first glass 403 in the second glass 404 because there may no migration of the second glass-forming material into the first glass-forming material across the interface, or vice versa.

In one embodiment, the interface 406 may be oriented substantially along a plane 410 of deposition of the monolithic glass structure 400 thereby bifurcating the monolithic glass structure into two portions, the first glass 403 and the second glass 404, having different compositions directly adjacent the interface.

As shown in FIGS. 5A-5D, two different inks, silica and silica with 20 nm gold nanoparticles were used to form a compositional change leading to a change in material property in the final heat-treated structure. FIGS. 5A-5B show the formation of an axial step in absorption in a final heat-treated structure. As shown in FIG. 5A, the LDF was formed with a conformational change in which the first ink silica was used to form a portion of the LDF (bottom of LDF in FIG. 5A), and then the ink was switched to the second ink, silica/gold nanoparticle ink (top of LDF in FIG. 5A). The LDF was then consolidated to glass by sintering in the heat treatment (step 238 of FIG. 2B). A resultant monolithic glass structure with a gradient in absorbance along an axial direction is shown in FIG. 5B in which the silica/gold nanoparticle portion of the glass is up in FIG. 5B.

In one embodiment a physical characterization of the monolithic glass structure 217 includes a gradient comprising two or more glass-forming materials such that the interface between a first glass-forming material and a second glass-forming material that is uniform. As illustrated in FIG. 5A, there is an interface between the upper glass-forming material (silica/gold nanoparticles) and the lower material (silica). Moreover, there is no migration of the first glass-forming material (silica) into the second glass-forming material (silica/gold nanoparticles), and vice versa, there is no migration of the second glass-forming material (silica/gold nanoparticles) into the first glass-forming material (silica).

The prior art methods to 3D print optical glass have not been able to achieve embodiments described herein because the prior art methods have difficulty controlling thermal gradients during 3D printing, have a non-uniform interface between filaments, and/or lack the capability to incorporate multiple materials within the green body or LDF.

In other approaches, a smooth composition change may be created by blending inline the ink streams from the different inks 203, 204 via active mixing with a mixing paddle 206 near the tip of the nozzle 208. As illustrated in a schematic representation of a top view in FIG. 4B, in one approach, a monolithic glass structure 420 with physical characteristics of formation by 3D printing (LDF 215 of FIG. 2B) may include a gradient in the refractive index, or another material property such as absorbance, along a radial direction of the monolithic glass structure 420. A radial 412 direction is along the plane 410 of deposition in any direction. Looking back to FIG. 2B, the glass structure is formed as a LDF (LDF 215 in FIG. 2B) in which a radial step in refractive index in which the two inks 203, 204 in FIG. 2B were blended inline the ink streams. The resulting glass structure 420 in FIG. 4B has a first glass 414 and a second glass 413, from the first glass-forming ink 203 and second glass-forming ink 204, respectively.

Figure 4B:
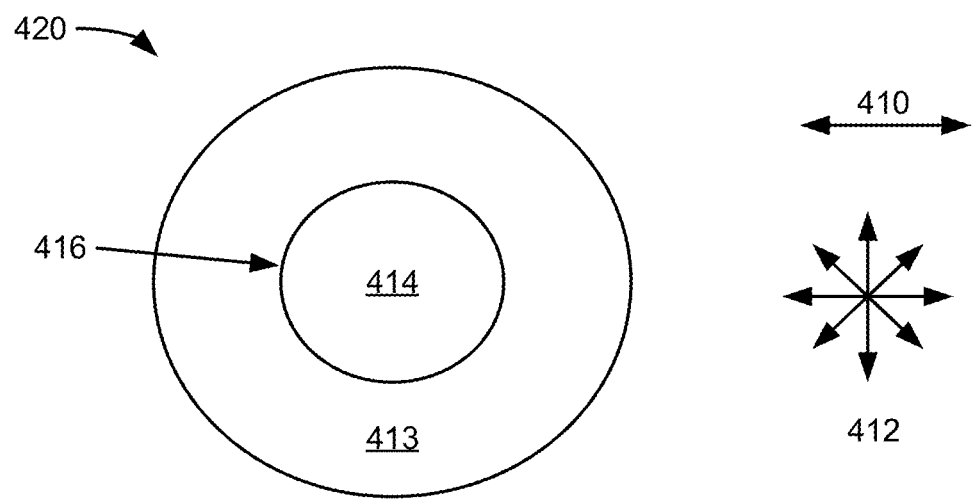
FIG. 4B is a schematic drawing of a low density form that includes a gradient in a material property of the low density form along a radial direction, according to one embodiment.

Moreover, the resulting glass structure 420 of FIG. 4B includes an interface 416 between first glass 414 formed from the glass-forming material and second glass 413 formed from a second glass-forming material having a different composition than the glass-forming material. In some approaches, there may be no intermixing of the first glass 414 in the second glass 413 because there may no migration of the second glass-forming material into the first glass-forming material across the interface, or vice versa.

In one embodiment, the interface 416 may be oriented substantially perpendicular to a plane 410 of deposition of the monolithic glass structure 420 thereby bifurcating the monolithic glass structure 420 into two portions, the first glass 413 and the second glass 414, having different compositions directly adjacent the interface 416.

According to one embodiment, two different inks may be used to print a conformational change in a LDF that leads to a material property of a radial step in absorbance in the final heat-treated structure. As shown in FIGS. 5C-5D, a first ink of silica and a second ink of silica/gold nanoparticles were used to print a radial step in absorbance in which the two inks were blended inline the ink streams. FIG. 5C shows the LDF form with the silica/gold nanoparticle ink in the center of the LDF and the silica ink on the outer portions of the LDF. A resultant monolithic glass structure with a gradient in the absorbance along a radial direction is shown in FIG. 5D.

The compositional changes may not be limited to axial and/or radial gradients (such as those that can be achieved by diffusion techniques) but rather can be made to create arbitrary profiles in the LDF.

Compositional changes in the LDF 215 may lead to varying material properties within the formed glass 217. Examples of material properties that may be affected by compositional changes in the LDF 215 are detailed more fully above, and may include, but may not be limited to: absorptivity, transmission, refractive index, dispersion, scatter, electrical conductivity, thermal conductivity, thermal expansion, gain coefficient, glass transition temperature (Tg) melting point, photoemission, fluorescence, chemical reactivity (e.g. etch rate), density/porosity.

As shown in FIG. 2B, DIW printing in steps 232, 234 may involve forming the LDF 215, according to one embodiment. The LDF begins in the first step 232 of DIW printing as a single layer on a substrate 210. As the DIW printing continues in step 234, the LDF 215 may be formed layer by layer until the desired LDF 215 (i.e. green body) is formed.

In some embodiments, formation of a LDF with single composition (method 200) or a multiple composition (for example, a gradient) (method 250) may involve fused deposition modeling (FDM). FDM uses thermoplastic filament, that may be a composite mixture of several materials combined with a mixing paddle similar to the ink mixture of DIW (see steps 232-234 of FIG. 2B). The resulting filament may be extruded through a heated nozzle to form a LDF on a substrate as shown in steps 222-224 or steps 232-234 in FIGS. 2A and 2B, respectively. The heated nozzle, at temperatures in the range of about 150° C. to 200° C., partially heats the filament for extrusion. In some approaches, a sacrificial support material may be extruded by a second nozzle to provide a support for the glass-forming material extruded by the mixing nozzle. In some approaches, the polymer of the extruded filament and/or support material may be removed after formation of the LDF.

In various embodiments, the LDF may be formed in a complex shape, for example, but not limited to, a conical form, a corkscrew pattern, a cylinder, etc.

The LDF 215 may be treated to multiple steps to consolidate and convert the LDF 215 to the heat-treated glass form 217.

Once formed, the LDF 215 may be dried and/or receive additional processing as described above for step 226 in method 200 in FIG. 2A.

Referring back to FIG. 2B, according to one embodiment, step 238 of method 250 includes heat treating the dried LDF 215 to close the remaining porosity and form a consolidated, transparent glass part. The resultant glass consolidated form 217 may retain the compositional variation that may have been imparted during DIW printing (steps 232, 234).

In one embodiment, the glass consolidated form 217 may have a physical characteristic of the LDF 215 including spiral-shaped, arcuate and/or straight ridges along one surface of the glass form 217.

According to one embodiment, in a post-processing step 240, the glass form 217 may be further processed, for example to achieve the desired figure and/or surface finish of a final polished optic 220 through techniques such as grinding and/or polishing. In one embodiment, the polished optic 220 is a polished formation by 3D printing and heat treatment, such that the properties of the LDF 215 remain and are not removed by polishing. In one embodiment, the polished optic 220 is a monolithic glass structure that has been polished.

The various embodiments described herein may be extended to a variety of (predominantly) amorphous, inorganic glass materials in addition to silica-based glasses, including phosphate-based glasses, borate glasses, germanium oxide glasses, fluoride glasses, aluminosilicate glasses, and chalcogenide glasses.

Engineered Feedstocks

Figure 11:
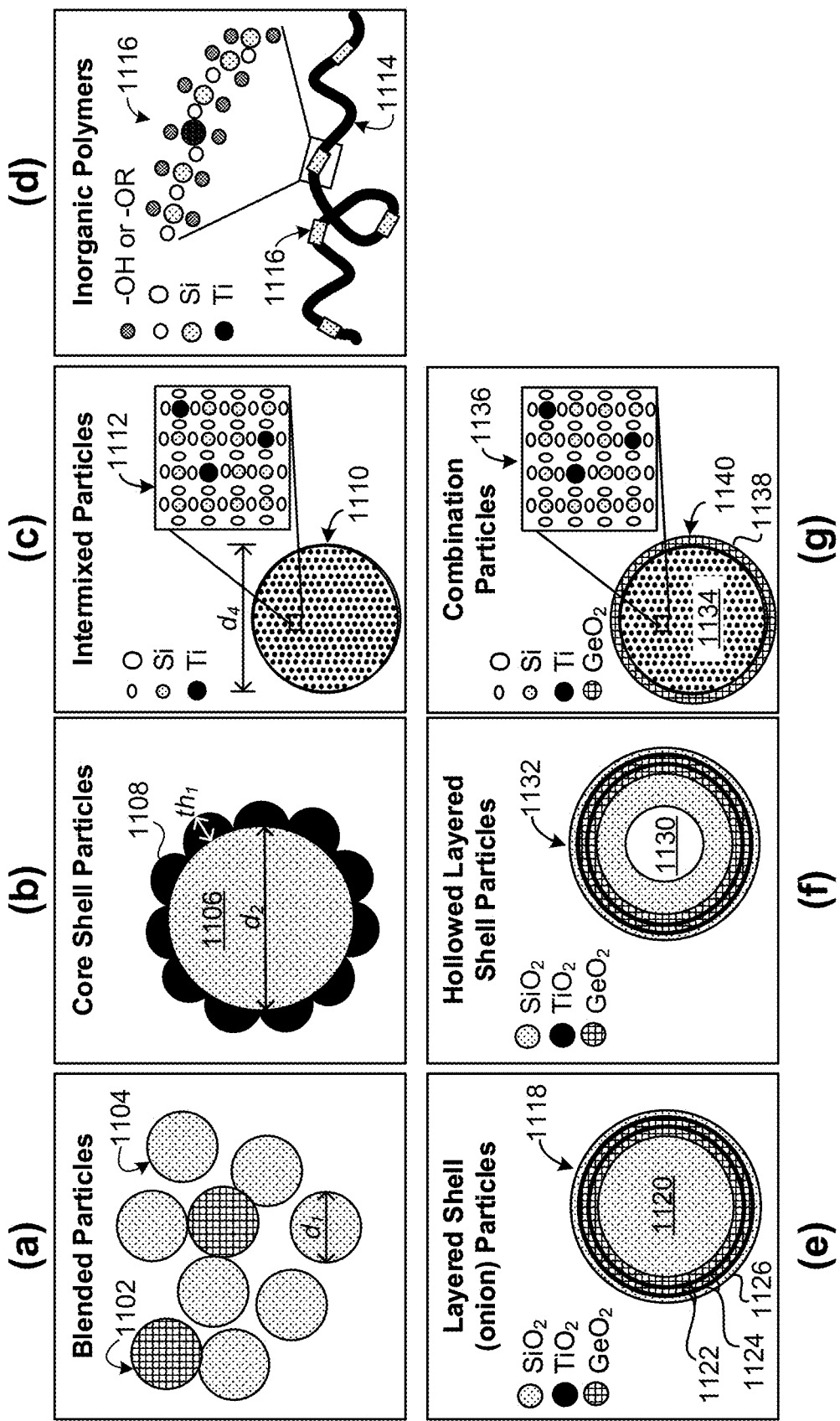
FIG. 11 is a series of schematic drawings of glass-forming material, according to various embodiments.

One embodiment describes a process for creating feedstocks (e.g., glass-forming material in an ink for AM) that may enable the production of glass of different compositions and with different material properties using additive manufacturing. Feedstocks can be engineered such that the size and chemical compositions (as well as chemical distributions) of the glass-forming feedstocks can be tuned to meet both the needs of the particular AM process as well as to deliver the desired glass composition and properties. Liquid chemical precursors or mixtures of precursors, such as metal organics or silanes, can be reacted together under tuned reaction conditions to form particles or long chains of prescribed size, and in a variety of form factors, either by simultaneous reaction or by performing a series of reaction steps via sol gel chemistry. FIG. 11 is a schematic drawing of various examples of embodiments described herein of engineered feedstocks for additive manufacturing of glass.

(a) Blended particles. A blend of different particles (blended particles) in a single composition may be used. As shown in the schematic diagram of part (a) of FIG. 11, glass-forming feedstock of blended particles, according to one embodiment, include a separate growth of particles of different compositions. For example, the particles may be grown via base-catalyzed sol gel chemistry. In one approach, particles of different compositions may include $SiO_2$ particles 1102 and $GeO_2$ particles 1104. The size scale of the particles would determine sufficient intermixing during co-thermal processing, and subsequent mixture of these particles during preparation for the AM process. In some approaches, the average diameter $d_1$ of the particles in the blended particle feedstock may be in a range of about 30 nm to about 50 nm, and the average diameter may be larger or smaller.

In one approach, blended particles may include $SiO_2$, $GeO_2$, $TiO_2$, etc. In one approach, blended particles may include $SiO_2$ with metal nanoparticles. In some approaches, blended particles may include $SiO_2$ with at least one of the following metal nanoparticles: gold, silver, nickel, copper, or a combination thereof. In one approach blended particles may include $SiO_2$—PbO (silica lead oxide).

In some approaches, compositions of blended particles may include more than two oxide species. For example, compositions of blended particles may include $SiO_2$—NaO—$TiO_2$, $SiO_2$—BaO—$TiO_2$, $SiO_2$—PbO—$TiO_2$, $SiO_2$—$GeO_2$—PbO, $SiO_2$—$GeO_2$—$TiO_2$, $SiO_2$—NaO—$Al_2O_3$, $SiO_2$—$B_2O_3$—$Al_2O_3$, etc.

(b) Core-shell particles. As shown in the schematic diagram of part (b) of FIG. 11, a feedstock may include core-shell particles. Core-shell particles may be formed by initial growth of a core particle from molecular precursors, followed by subsequent reaction, resulting in a growth of a shell or coating over the surface of the core particles. In one approach as shown in part (b), a $SiO_2$ core particle 1106 may have a $TiO_2$ shell 1108 formed over the surface of the $SiO_2$ core particle 1106. In one approach, the shell may be in islands dispersed around the particle. In another approach, the shell may be a fully formed continuous layer. In some approaches, the average diameter $d_2$ of the core particle 1106 may be in a range of about 25 nm to about 200 nm, and the average diameter may be larger or smaller. In some approaches, the average thickness $th_1$ of the shell 1108 may be in a range of about 2 nm to about 4 nm, and may be larger or smaller.

In one approach, core-shell particles may include $SiO_2$, $GeO_2$, $TiO_2$, etc. In one approach, core-shell particles may include $SiO_2$ with metal nanoparticles. In some approaches, core-shell particles may include $SiO_2$ with at least one of the following metal nanoparticles: gold, silver, nickel, copper, or a combination thereof. In one approach core-shell particles may include $SiO_2$—PbO (silica lead oxide).

In some approaches, compositions of core-shell particles may include more than two oxide species. For example, compositions of core-shell particles may include $SiO_2$—NaO—$TiO_2$, $SiO_2$—BaO—$TiO_2$, $SiO_2$—PbO—$TiO_2$, $SiO_2$—$GeO_2$—PbO, $SiO_2$—$GeO_2$—$TiO_2$, $SiO_2$—NaO—$Al_2O_3$, $SiO_2$—$B_2O_3$—$Al_2O_3$, etc.

(c) Intermixed particles. As shown in part (c) of FIG. 11, a feedstock may include intermixed particles. In various approaches, intermixed particles are particles that are co-grown from a mixture of molecular precursors, with chemistry tuned to achieve an intermixture of the different chemical species within the same particles. In one approach, as illustrated in part (c), a particle 1110 may include an intermixture 1112 of O, Si, and Ti (where the intermixture 1112 is shown in a magnified view of a portion of the particle 1110). In various approaches, an average diameter $d_4$ of the particle 1110 may be in a range of about 100 nm to about 400 nm, and the average diameter may be larger or smaller.

In one approach, a glass-forming feedstock may include an intermixture (as illustrated in the magnified view of an intermixture 1112) within formation of small clusters of particles grown together, and the clusters may not form a particle. In one approach, the intermixed feedstock may include oxo-clusters, oligomer-based clusters, small structures, agglomerate, etc. of particles containing different chemical species. In some approaches, the average diameter of the small cluster, agglomerate, oxo-cluster, etc. may be in a range of about 100 nm to about 400 nm, and may be larger or smaller.

In one approach, intermixed particles may include $SiO_2$, $GeO_2$, $TiO_2$, etc. In one approach, intermixed particles may include $SiO_2$ with metal nanoparticles. In some approaches, intermixed particles may include $SiO_2$ with at least one of the following metal nanoparticles: gold, silver, nickel, copper, or a combination thereof. In one approach intermixed particles may include $SiO_2$—PbO (silica lead oxide).

In some approaches, compositions of intermixed particles may include more than two oxide species. For example, compositions of intermixed particles may include $SiO_2$—NaO—$TiO_2$, $SiO_2$—BaO—$TiO_2$, $SiO_2$—PbO—$TiO_2$, $SiO_2$—$GeO_2$—PbO, $SiO_2$—$GeO_2$—$TiO_2$, $SiO_2$—NaO—$Al_2O_3$, $SiO_2$—$B_2O_3$—$Al_2O_3$, etc.

(d) Inorganic polymers. As shown in part (d) of FIG. 11, feedstocks may include inorganic polymers. In one approach, polymers may be co-grown via acid-catalyzed sol gel chemistry, from a mixture of molecular precursors, resulting in intimate chemical species intermixture within long molecular chains rather than particles. As illustrated in part (d), the long molecular chain of polymer 1114 may have intimate chemical species intermixture 1116. A magnified view of intermixture 1116 shows different chemical species may include Ti, Si, O, species having —OH or —OR groups, etc. The chemical species listed are by way of example only, and are not meant to be limiting in any way.

(e) Layered shell particles. As shown in part (e) of FIG. 11, glass-forming feedstocks may include layered shell particles, e.g., layered as onion layers. In various approaches, a layered shell particle has a core particle has a shell similar to the core shell particle of part (b), but also includes repeated surface reactions performed on the core shell particle to generate additional layers of different compositions. A thickness of each layer may be tuned according to a desired specification. In some approaches, the thickness of each layer of the shell may be in a range of about 2 nm to about 10 nm, but the thickness may be higher or lower. In some approaches, a cumulative thickness of the plurality of layers of the shell being in a range of about 4 nm to about 50 nm, but the thickness may be higher or lower.

As illustrated in part (e), an example of layered shell particle 1118 may include a $SiO_2$ core particle 1120 may several layers of different compositions including two layers of $GeO_2$ 1122 alternated with two layers of $TiO_2$ 1124, and a final $SiO_2$ shell layer 1126. In one approach, a layered shell particle includes at least two shell layers above a core particle, where each of the at least two shell layers has a different composition. In some approaches, the shell layers above the core particle have alternating compositions, e.g., composition 1-composition 2-composition 1-composition 2-etc.

In one approach, layered shell particles may include $SiO_2$, $GeO_2$, $TiO_2$, etc. In one approach, layered shell particles may include $SiO_2$ with metal nanoparticles. In some approaches, layered shell particles may include $SiO_2$ with at least one of the following metal nanoparticles: gold, silver, nickel, copper, or a combination thereof. In one approach layered shell particles may include $SiO_2$—PbO (silica lead oxide).

In some approaches, compositions of layered shell particles may include more than two oxide species. For example, compositions of layered shell particles may include $SiO_2$—NaO—$TiO_2$, $SiO_2$—BaO—$TiO_2$, $SiO_2$—PbO—$TiO_2$, $SiO_2$—$GeO_2$—PbO, $SiO_2$—$GeO_2$—$TiO_2$, $SiO_2$—NaO—$Al_2O_3$, $SiO_2$—$B_2O_3$—$Al_2O_3$, etc.

(f) Hollow layered shell particles. As shown in part (f) of FIG. 11, glass-forming feedstocks may include hollow layered shell particles. In one approach a layered shell particle as illustrated in part (e) may have all or part of the original core of the particle removed before subsequent layering of species via sol gel chemistry. In one approach, a hollow layered shell particle may limit the central domain size for composition, prevent phase separation, or a combination thereof.

As illustrated in part (f), in one approach a hollow layered shell particle 1132 may have a hollow core region 1130 with layers in similar format as described for the layered particle 1118 in part (e).

(g) Combination or hybrid particles. In various approaches, particles of feedstocks as described in parts (a) through (f) may be combined to form hybrid and/or combination particles. For example, as illustrated in part (g), a combination particle 1140 may be a combination of a core shell particle as illustrated in part (b) with a core particle 1134 being an intermixed particle as illustrated in part (c). As shown, the core particle 1134 may include intermixed particles 1136 as shown by the magnified view, and the core particle may have a $GeO_2$ shell 1138. These approaches are by way of example only, and are not intended to be limiting in any way.

In various approaches, a glass-forming feedstock may include a combination particle having at least two features as described herein: a shell, an intermixed core, a layered shell, a layered shell particle having a hollow core, and an inorganic polymer.

Figure 12:
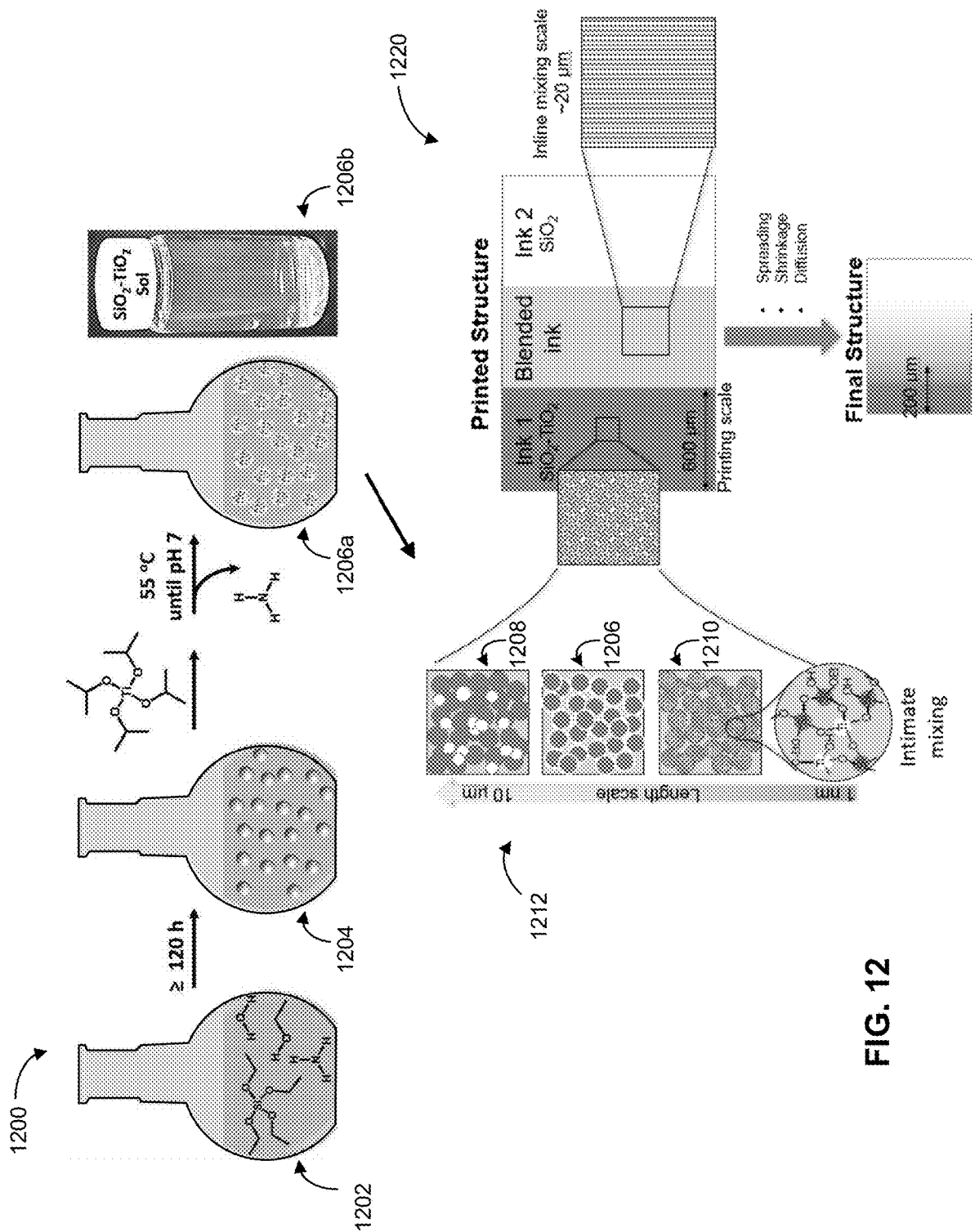
FIG. 12 is a schematic drawing of preparing glass-forming feedstocks for inks to be used for printing 3D glass structures, according to various embodiments.

FIG. 12 is a schematic drawing of a process of engineering feedstocks for AM techniques leading to formation of glass structures. The process 1200 of growing the feedstock of $SiO_2$—$TiO_2$ particles is illustrated in steps 1202 and 1204 thereby forming $SiO_2$ particles. Step 1206a includes adding a $TiO_2$ shell to the $SiO_2$ particles to make the feedstock of $SiO_2$—$TiO_2$ core-shell particles for AM processing. Image 1206b is shows a suspension of $SiO_2$—$TiO_2$ core-shell particles.

Process 1220 of FIG. 12 illustrates several possible steps for forming a glass structure using engineered feedstocks, according to one embodiment. As shown, the $SiO_2$—$TiO_2$ core-shell particles of step 1206 may be one of several engineered feedstocks 1212 that may be used for printing. Without meaning to be limiting in any way, two additional engineered feedstocks 1212 may be used for printing, blended particles 1208 and/or intermixed particles 1210. A magnified view of 1210 shows the different chemical compositions that may be included in an intermixed particle.

In various embodiments, the engineered glass-forming feedstocks may be used with AM techniques to form printed glass.

In some embodiments, the type of engineered feedstock to be used may depend on the desired length scale for printing. In one approach, a blended particle feedstock may be desirable for larger length scales of 10 μm. In another approach, an intermixed particle feedstock may be desirable for shorter length scales of 1 nm. These approaches are presented for example only, and are not meant to be limiting in any way.

The properties of the feedstocks may be tailored to optimize factors critical to processing of feedstocks by AM. In some approaches, these properties include the sphericity and degree of agglomeration of the particles, which may influence the flowability of the particles as powder or the particles suspended in a solvent or resin. In some approaches, the properties include the compatibility of the feedstock material with solvents. In some approaches, the properties include the relative miscibility of the feedstock material with other feedstock materials.

Furthermore, the feedstocks may be tailored to optimize further processing of the green body (product of AM techniques) formed from feedstocks to form glass. In some approaches, the properties of the particle in the feedstocks may affect the sintering temperature during further processing to form glass. In some approaches, the properties of the particles in the feedstocks include packing density and sizes of voids, which may affect the likelihood of achieving transparent, crack free glass.

In addition, particle feedstocks as described herein allows tailoring length scales to a desired specification relative to the distribution of each different species thereby allowing predefined uniformity/homogeneity of the feedstock material and reducing the propensity of species to phase separate and crystallize during thermal processing.

In various approaches, methods to prepare inks from the glass-forming feedstocks may include single pot solvent exchange, size-selective precipitation, ink filtration, etc.

In some approaches, the glasses formed by methods described herein may include rare earth dopants. In some approaches, the formed glass may include $P_2O_5$-based glass with dopants such as $Nd^{3+}$, $Yb^{3+}$, $Ce^{2+}$, $Er^{3+}$, $Ho^{3+}$, $Gd^{3+}$, etc. In some approaches the glass may include $SiO_2$-based glass with dopants such as $Nd^{3+}$, $Yb^{3+}$, $Ce^{2+}$, $Er^{3+}$, $Ho^{3+}$, $Gd^{3+}$, etc.

In some approaches the glasses formed by methods described herein may include oxide species such as $Al_2O_3$, alumina, as an additive to improve solubility and improved phase stability.

Mixing of the inks for printing glass structures may include a mixing calibration method and printing compensation scheme to allow parts to be printed following a specification.

In some approaches, the glass structures may be printed on substrates that prevent the glass parts from cracking. Exemplary materials of substrates include silicone rubber, silicone-treated surfaces including paper, aluminum, Teflon, porous substrates (such as porous paper), etc.

In some approaches, printed glass parts at the green body stage may be processed by chemical treatment. For example, chemical treatment of green bodies may include $NH_3$, $CH_3COOH$, TEOS, triethylamine atmosphere, etc. to promote chemical bond formation, encourage solvent removal, etc.

In some approaches, printed glass parts at the green body stage may be processed by heat treatment atmosphere techniques. For example, heat treatment atmosphere techniques may include air, vacuum, nitrogen, helium, or mixture containing sources of chlorine or fluorine (e.g., $Cl_2$, $F_2$, HF, fluorinated alkoxides (e.g., $Si(OC_2H_5)_3F$)), etc.

In some approaches, printed glass parts at the green body stage may be processed by microwave drying. In some approaches, printed glass parts at the green body stage may be processed by pressure-based methods, for example cold isostatic pressing, pressing, hot isostatic pressing, etc.

Engineered feedstocks may be used for producing single or multi-component glasses of a variety of compositions using different additive manufacturing techniques. This would enable glasses for which there is currently no viable feedstock to be prepared via AM processes.

In various embodiments, engineered feedstocks could be used for preparing glasses by additive manufacturing processes including direct ink writing, robocasting, computed axial lithography, projection microstereolithography (or other stereolithography printing techniques), ink jet, electrophoretic deposition, and powder bed techniques such as selected laser melting/sintering, binder jetting, etc. In various embodiments, engineered feedstocks may also be used for coating processes such as dip coating, meniscus coating, spin coating, etc.

Example 1 of Heat Treatment

Printed monolithic silica or silica-titania green-bodies (25 mm diameter, 5 mm thick) are placed onto a hot-plate at 100° C. After 3 hours, the printed green bodies are released from the substrate. The green bodies are then dried in a box furnace at 100° C. for 110 hours. Next, the liquid-free green bodies are heated to 600° C. at a ramp rate of 10° C./min and left to dwell for 1 hour to burn out remaining organic components. The green bodies are then ramped at 100° C./hr to 1000° C. and held for 1 hr under vacuum. Last, the part is sintered in a preheated furnace at 1500° C. for 3-10 minutes. The parts are then removed and rapidly cooled to room temperature. All non-vacuum processing steps are performed in air.

Example 2 of Heat Treatment

Printed monolithic silica green-bodies composed of 25-nm diameter silica or silica-titania particles (25 mm diameter, 5 mm thick) ramped in a box furnace to 75° C. at a rate of 3° C./h. Once the oven reaches 75° C., the printed green bodies are released from the substrate. The green bodies are then dried in a drying oven at 75° C. for 120 hours. Next, the liquid-free green bodies are heated to 600° C. at a ramp rate of 1° C./min and left to dwell for 1 hour to burn out remaining organic components. Last, the part is sintered in a preheated furnace at 1150° C. for 1 hour. The parts are then removed and rapidly cooled to room temperature. All non-vacuum processing steps are performed in air.

Experiments

Figure 6A:
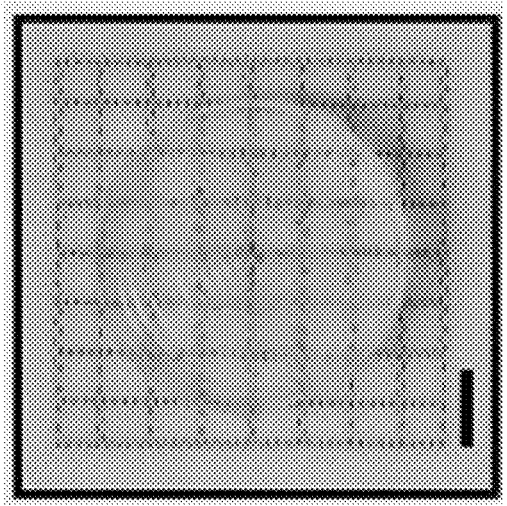
FIGS. 6A-6C are images of printed parts formed with a silica composition, according to one embodiment.
Figure 6B:
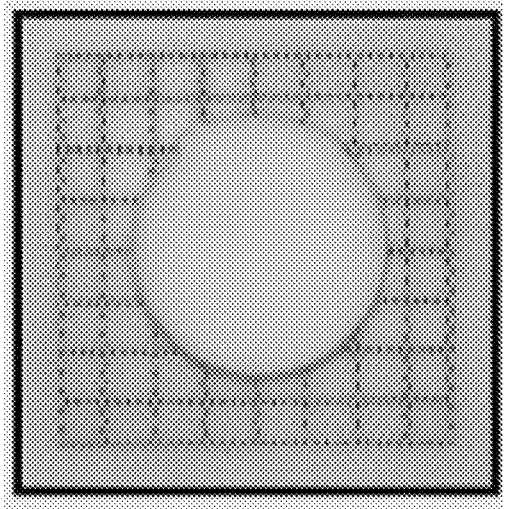
Figure 6C:
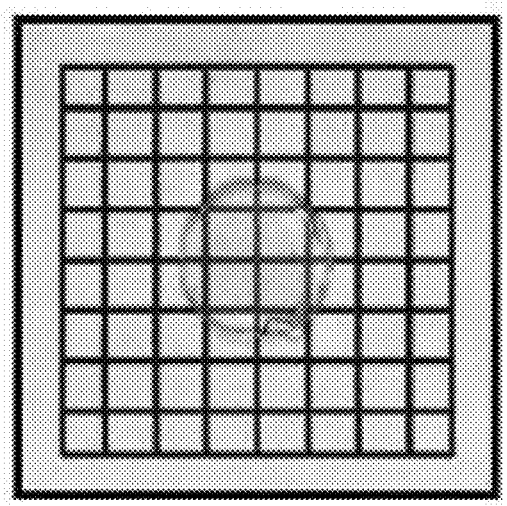

FIGS. 6A-6F are images of printed parts made with Formulation 3 of Ink (as described above). FIGS. 6A-6C are images of printed parts formed with a silica-only composition. FIG. 6A is an images of the green body formed after printing. FIG. 6B is an image after drying of the green body of FIG. 6A. FIG. 6C is an image after consolidation of the dried green body of FIG. 6B.

Figure 6D:
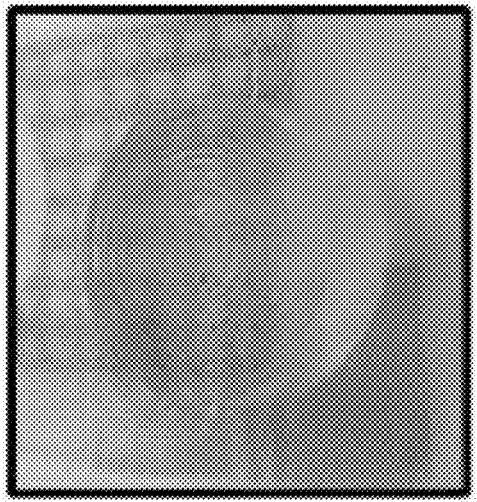
FIGS. 6D-6E are images of printed parts formed with a silica-titania composition, according to one embodiment.
Figure 6E:
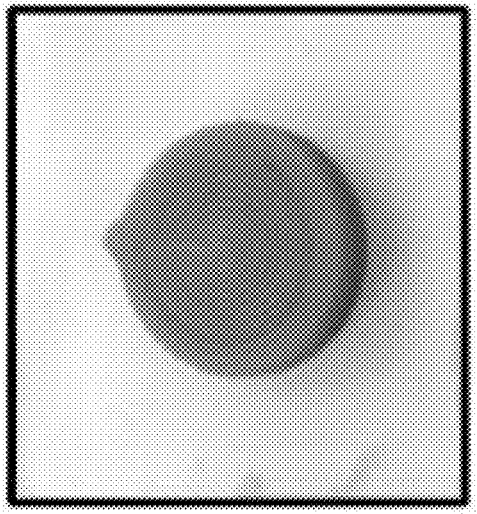
Figure 6F:
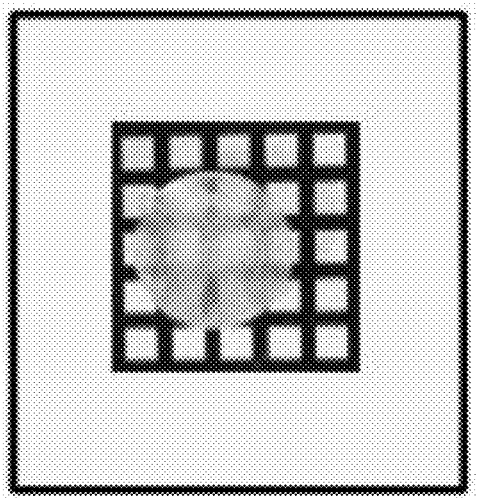
FIG. 6F is an image after consolidation of the dried green body of FIG. 6E.

FIGS. 6D-6F are images of printed parts formed with a silica-titania composition. FIG. 6D is an image of the green body formed after printing. FIG. 6E is an image after drying of the green body of FIG. 6D. FIG. 6F is an image after consolidation of the dried green body of FIG. 6E.

Figure 7A:
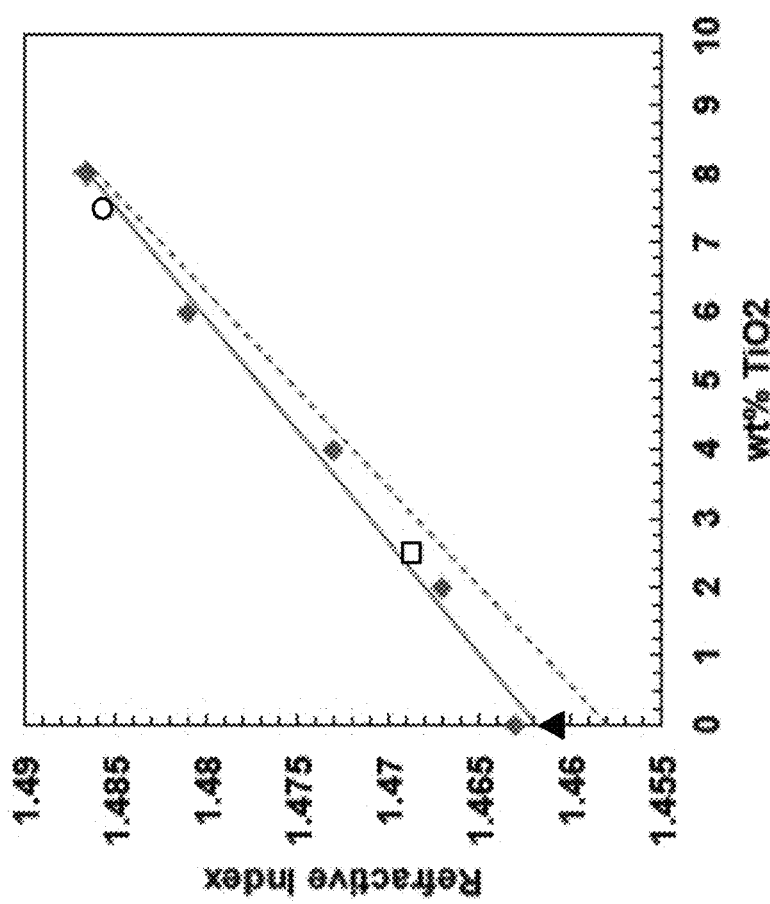
FIG. 7A is a plot of refractive index profile verses titania concentration of glass formed according to one embodiment.
Figure 7B:
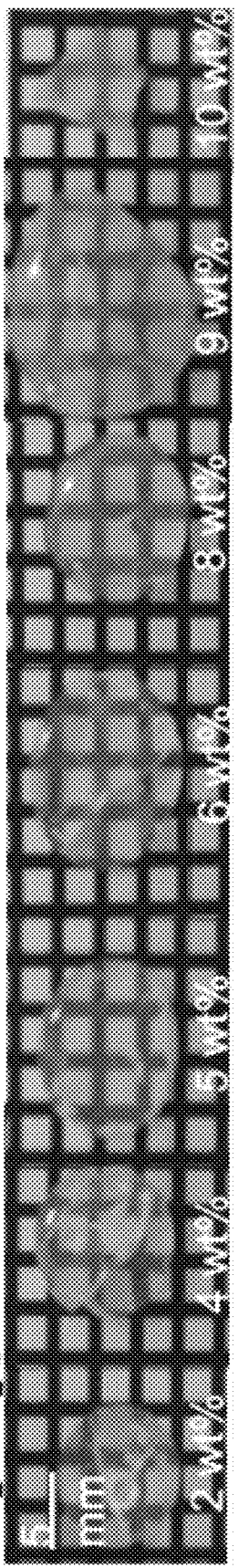
FIG. 7B is an image of the resultant glass structures formed with different titania concentrations, according to one embodiment.

FIG. 7A is a plot of refractive index profile (y-axis) versus titania ($TiO_2$) concentration (wt %, x-axis) in a resultant glass. Glasses made from the inks of Formulation 1 (as described above) are represented on the plot as diamonds (♦, solid line) and have a variation in refractive index comparable to commercial silica (▲) and silica-titanate glasses (○, □) (dotted line). FIG. 7B is an image of the resultant glass structures formed from the ink formulations represented by the diamonds (♦) of FIG. 7A at different concentrations of wt % $TiO_2$ (2 wt %, 4 wt %, 5 wt %, 6 wt %, 8 wt %, 9 wt %, 10 wt %).

Figure 8:
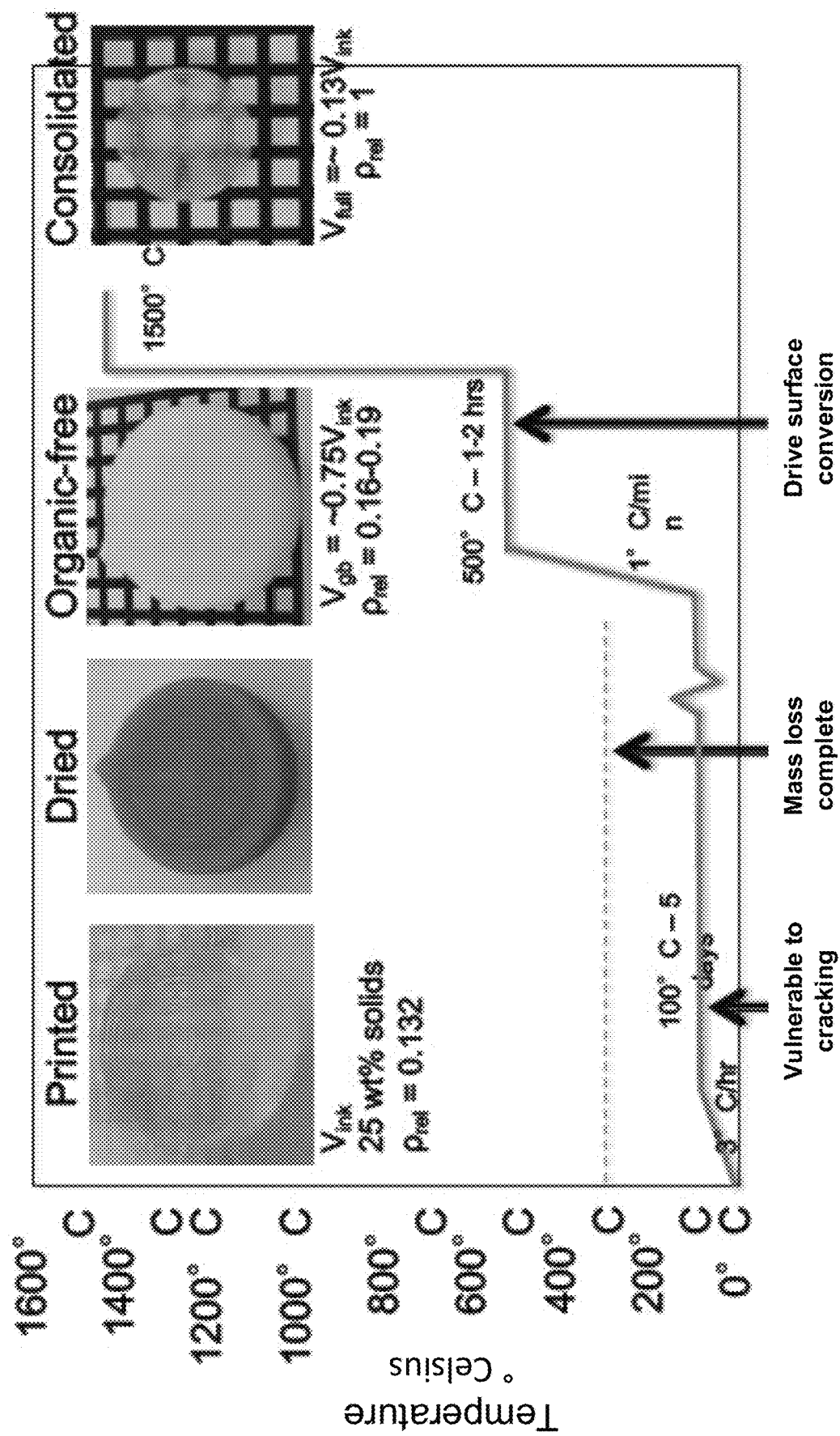
FIG. 8 is a plot of the thermal treatment profile of the formation of a consolidated structure according to one embodiment. Images of each step are included as insets on the profile plot.

FIG. 8 is a plot of the thermal treatment profile of the formation process of a consolidated printed parts using Formulation 1 Ink (as described above). The volumetric shrinkage ($V_{ink}$) of the structure at each step during the heat treatment process is shown next to the image of the structure.

Figures 9A, 9B, 9C:
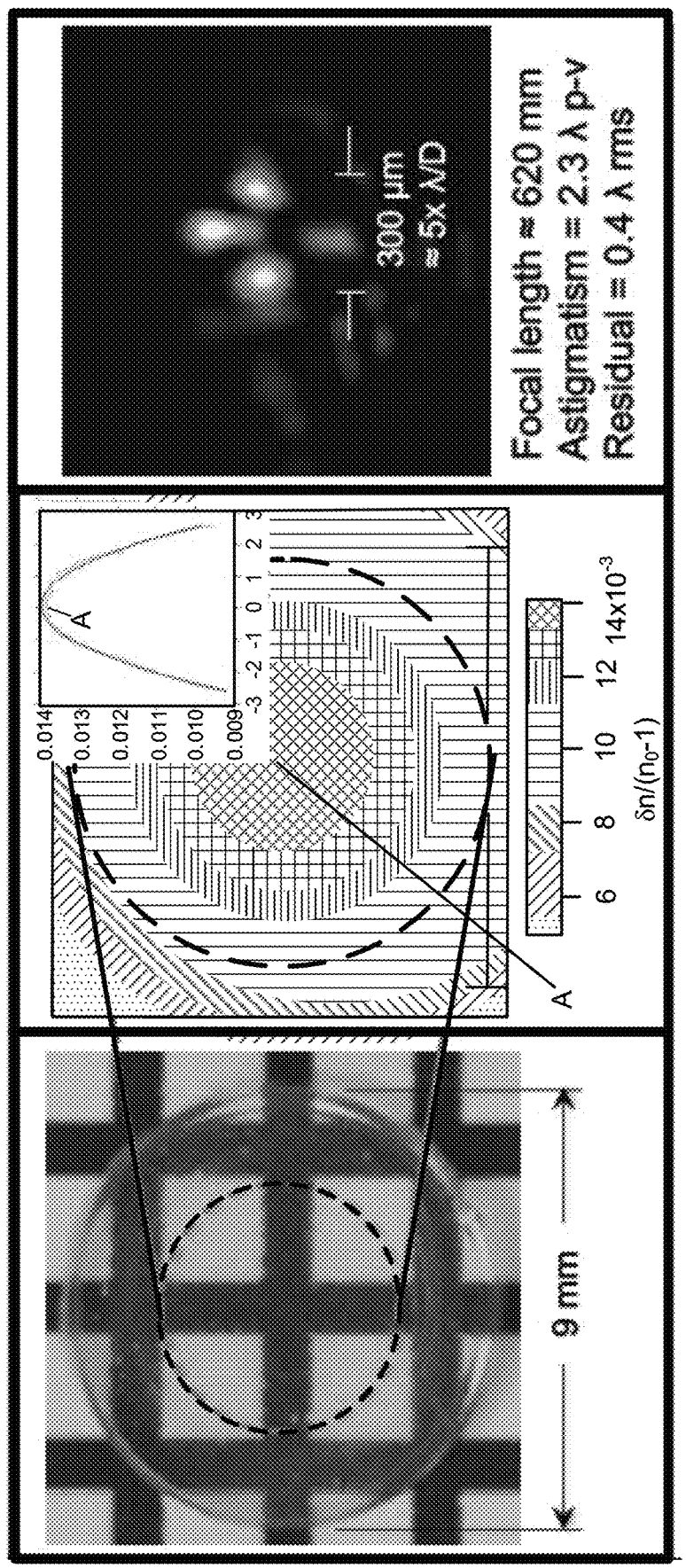
FIG. 9A is an image of a gradient refractive index silica-titania glass lens prepared by direct ink writing, according to one embodiment.
FIG. 9B is a surface-corrected interferogram of the glass lens of FIG. 9A.
FIG. 9C is an image of the 300-µm focal spot from the lens of FIG. 9A.

FIG. 9A is an optical image of a gradient refractive index silica-titania glass lens prepared by direct ink writing the LDF while blending two inks inline at the printhead in the required ratio to deposit a radial gradient in $TiO_2$ concentration. Two inks were used from the Formulation 1 Ink (described above), Ink A contained 0% titanium alkoxide and Ink B contained enough titanium alkoxide to result in 1.6 wt % $TiO_2$ in the final consolidated glass. The glass was consolidated using the heat treatment profile shown in FIG. 8 and then polished using ceria pad polishing. FIG. 9B is a surface-corrected interferogram, which shows how the refractive index changes within the bulk of the material shown in the image of FIG. 9A. The refractive index is highest at the center, where the $TiO_2$ composition is highest, and lowest at the edges, where the $TiO_2$ concentration is lowest. A lineout across the center shows that the refractive index change across the center is parabolic, as shown by the inset plot of FIG. 9B ($\delta n/(n_0-1)$ on y-axis, Distance (mm) on x-axis), which suggests the part can function as a lens. FIG. 9C is an image of the 300-μm focal spot from the lens, which has a focal length of 62 cm.

Figure 10B:
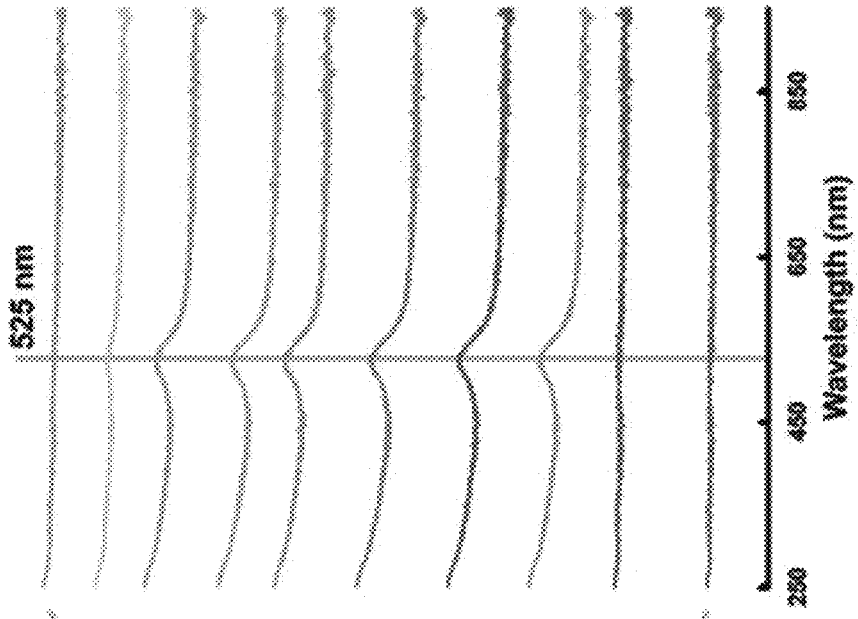
FIG. 10B is a plot of the absorbance as a function of wavelength of light of the composite glass of FIG. 10A.
Figure 10A:
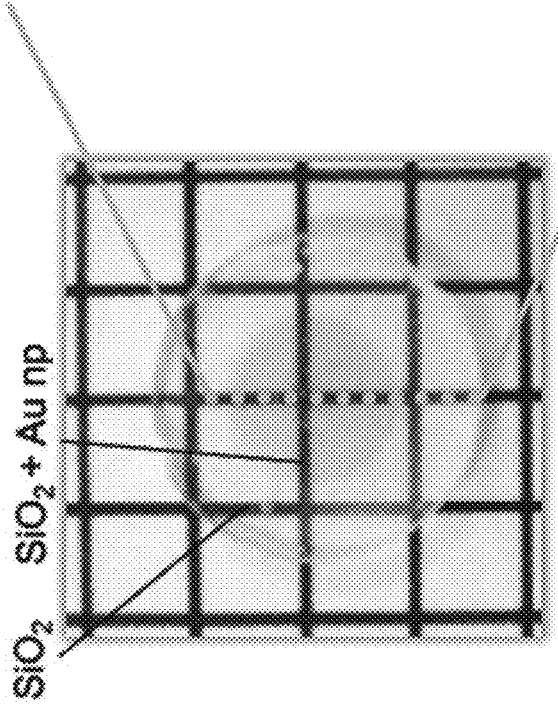
FIG. 10A is an image of a composite glass comprised of a gold-doped silica glass core, according to one embodiment.
Figure 10C:
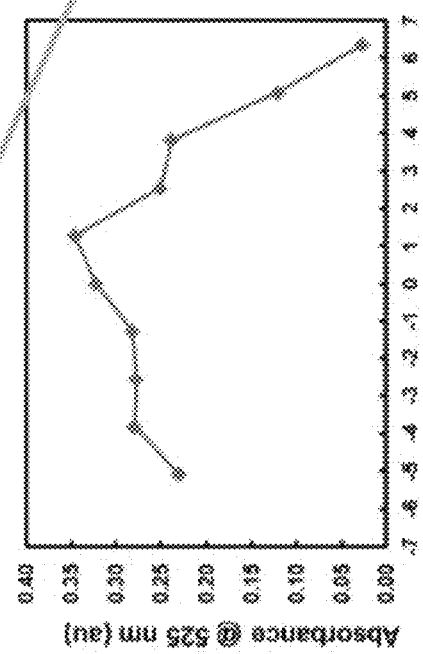
FIG. 10C is a plot of the absorbance at 525 nm versus position along the glass surface of the composite glass of FIG. 10A.

FIG. 10A is an optical image of a composite glass comprised of a gold-doped silica glass core with an undoped silica glass cladding, which was prepared by direct ink writing the composition change into the LDF. Two silica inks were used, with one ink containing gold nanoparticles. FIG. 10B is a plot of the absorbance as a function of wavelength of light, with each spectrum corresponding to the indicated positions across the glass. The peaks at 525 nm were attributed to absorbance from the gold nanoparticles. FIG. 10C is a plot of the absorbance at 525 nm (y-axis) versus position along the glass surface (x-axis, with the position 0 being the center of the glass). The plot of FIG. 10C represents that the absorbance at 525 nm was tuned within this glass. The spot size measured was an average over a ~1 mm diameter spot.

Experiments of Feedstocks for Additive Manufacturing to Form Glass
Core-Shell Particles $SiO_2$ particles were prepared by the Stöber process by mixing tetraethylorthosilicate (TEOS), water, and ammonia catalyst in an ethanol (EtOH) solvent. Particles were grown to steady state for approximately 5 days and were measured having an average diameter of 23.6±0.7 nm by dynamic light scattering (DLS), shown in FIG. 13A. Particle size and spherical morphology were confirmed by transmission electron microscope (TEM), as shown in part (a) and a magnified view in part (b) of FIG. 13B.

For $SiO_2$—$TiO_2$ core-shell nanoparticles (FIGS. 13C-13E), titanium (IV) isopropoxide (TIP) was added to the aged $SiO_2$ sol and heated at 55° C. to control the reaction through evaporation of the ammonia catalyst, yielding raspberry-like particles. Resulting nanoparticles were 25.4±0.4 and 34.1±4.8 nm in diameter for 1.5 and 5 wt % $TiO_2$-containing nanoparticles by DLS, as shown in FIG. 13A.

TEM images in part (a) and the magnified view of part (b) FIGS. 13C and 13D confirm the respective nanoparticle sizes and evolution of the raspberry-like particle morphology of 1.5 wt % and 5.0 wt % $TiO_2$-containing nanoparticles, respectively.

A schematic of the particle is shown for each particle: $SiO_2$ in part (c) of FIG. 13B, 1.5 wt % $TiO_2$—$SiO_2$ in part (c) of FIG. 13C, and 5.0 wt % $TiO_2$—$SiO_2$ in part (c) of FIG. 13D. Each schematic depicts the relative extents of $TiO_2$ coatings for 1.5 and 5 wt % $TiO_2$—$SiO_2$ nanoparticles.

FIG. 13E shows that at 8 wt % $TiO_2$ loading, the $SiO_2$—$TiO_2$ nanoparticles did not clearly form in a raspberry morphology (part (a) and the magnified view in part (b)). However, DLS measurements show that the particles were typically 38.8±0.5 nm, suggestive of a larger $TiO_2$ shell as shown in FIG. 13A.

Intermixed Particles and Sub-Structures

Figure 14B:
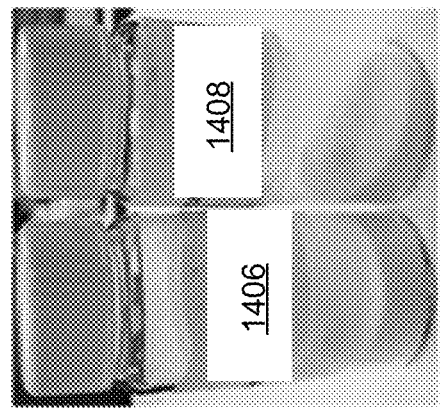
FIG. 14B is an image of vials containing dried intermixed particle preparations, according to various embodiments.
Figure 14A:
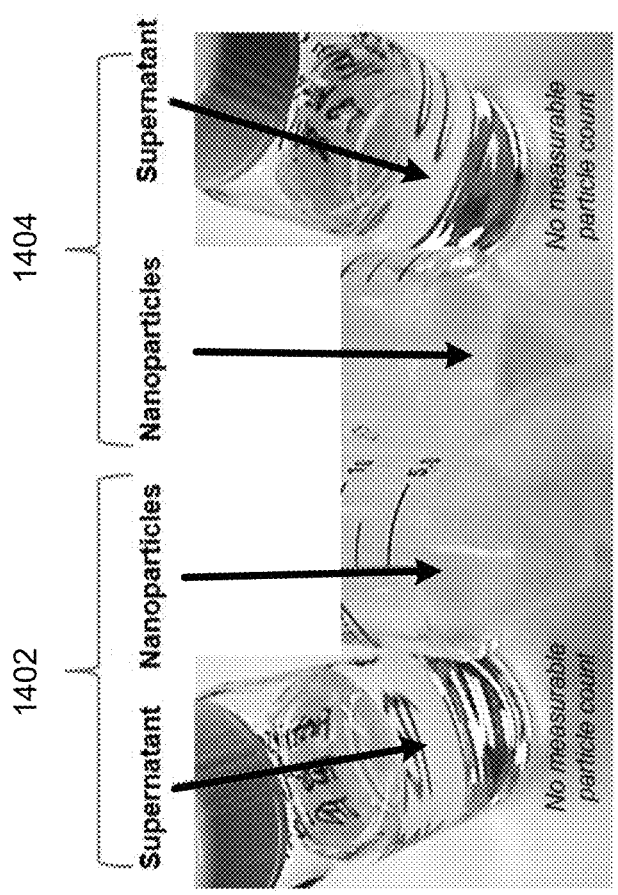
FIG. 14A is an image depicting the supernatant and nanoparticle pellets of two intermixed particle preparations, according to various embodiments.

FIGS. 14A-14B illustrate samples of intermixed particles formed by methods described herein. Two samples 1402, 1404 of titania-silica intermixed particles are shown in FIG. 14A, in which after centrifugation, the Supernatant of each showed no measurable particle count, and each had a pellet of nanoparticles collected at the base of the centrifuge tube.

The collected titania-silica intermixed nanoparticles were filtered and dried to form the powder as shown FIG. 14B of images of vials 1406 and vial 1408.

An example of a hybrid intermixed particle is shown in FIGS. 15A-15C, according to one embodiment. As illustrated in FIG. 15A, part (a) shows examples of molecular precursors TEOS and TIP that may be used to form a hybrid particle as drawn in part (b). The resulting hybrid particle may be in the form of small clusters, oxo-clusters, oligomer-based particles, etc. as shown rather than a distinct particle. An average diameter of the clusters forming the hybrid intermixed particle-like form may be in range of 100 nm to 400 nm.

FIG. 15B is an image of the suspended hybrid particles having estimated average diameter, as measured by DLS, of about 250 nm.

FIG. 15C are images of TEM of the hybrid particles at a lower magnification in part (a) and a higher magnification in part (b). The clusters shown in the images may be comprised of smaller structures having an average diameter of about 12 nm. Each of the structure may include the different chemical compositions as illustrated in the schematic drawing of FIG. 15A.

Inorganic Polymers

Figure 16A:
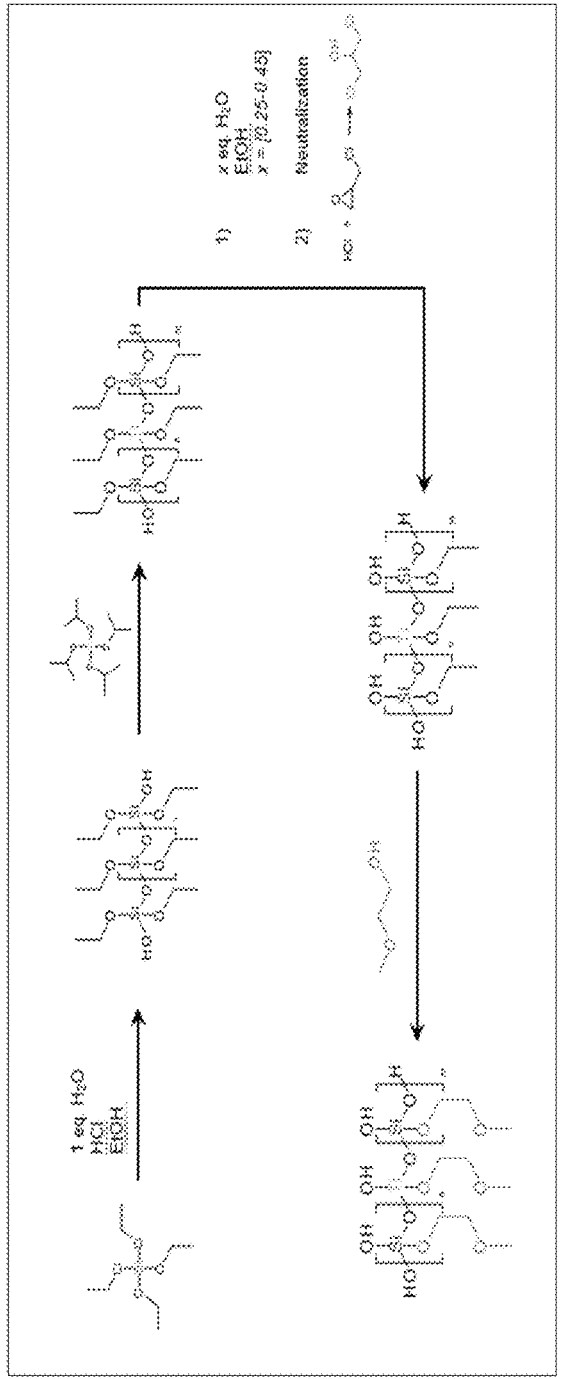
FIG. 16A is a schematic drawing of the general process for forming an inorganic polymer suitable for printing, according to one embodiment.
Figure 16B:
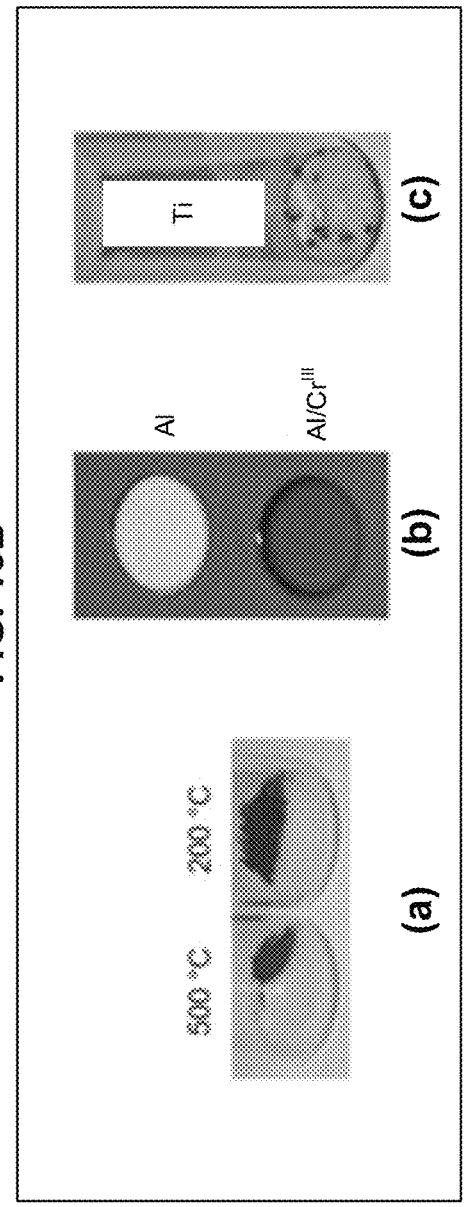
FIG. 16B part (a) is an image of products of inorganic polymer feedstocks, according to one embodiment.

FIGS. 16A-16B show an example of inorganic polymers engineered as a feedstock for using AM techniques for forming glass structures, according to one embodiment. FIG. 16A demonstrates the general process for forming an inorganic polymer suitable for printing in which, sequentially, (1) a silicon alkoxide is hydrolyzed under acidic conditions using sub-stoichiometric $H_2O$ for hydrolysis, (2) a titanium alkoxide is added to introduce titanium into the partially hydrolyzed silicon oxo-polymer, (3) additional hydrolysis to promote crosslinking and viscosity tuning, (4) neutralization of the acidic species, (5) transesterification of alkoxide ligands to functionalize the polymeric strands, and (6) evaporative removal of solvents and unreacted reagents. Non-volatile alkoxide ligands inhibit shrinkage and/or cracking during ambient drying and thus, resulting in an air sensitive, oil-like ink.

The images shown in FIG. 16B show different products of the inorganic polymer feedstocks after AM processing. Part (a) shows a green body using an $Cr^{III}$ inorganic polymer feedstock heated at 500° C. and 200° C. Part (b) shows the glass products from the process using an Al inorganic polymer feedstock and an Al/$Cr^{III}$ inorganic polymer feedstock. Part (c) shows the product of a Ti inorganic polymer feedstock after calcination of the green body.

Layered Shell Particles

Figure 17A:
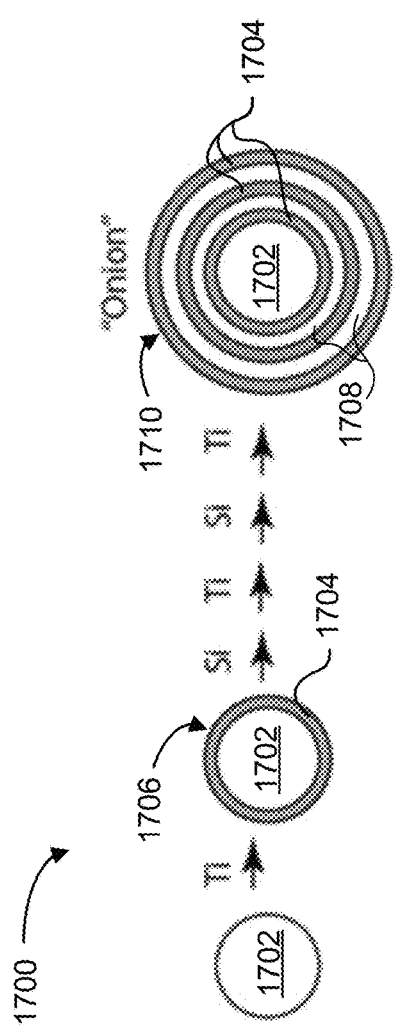
FIG. 17A is a schematic drawing of forming a layered shell particle, according to one embodiment.
Figure 17B:
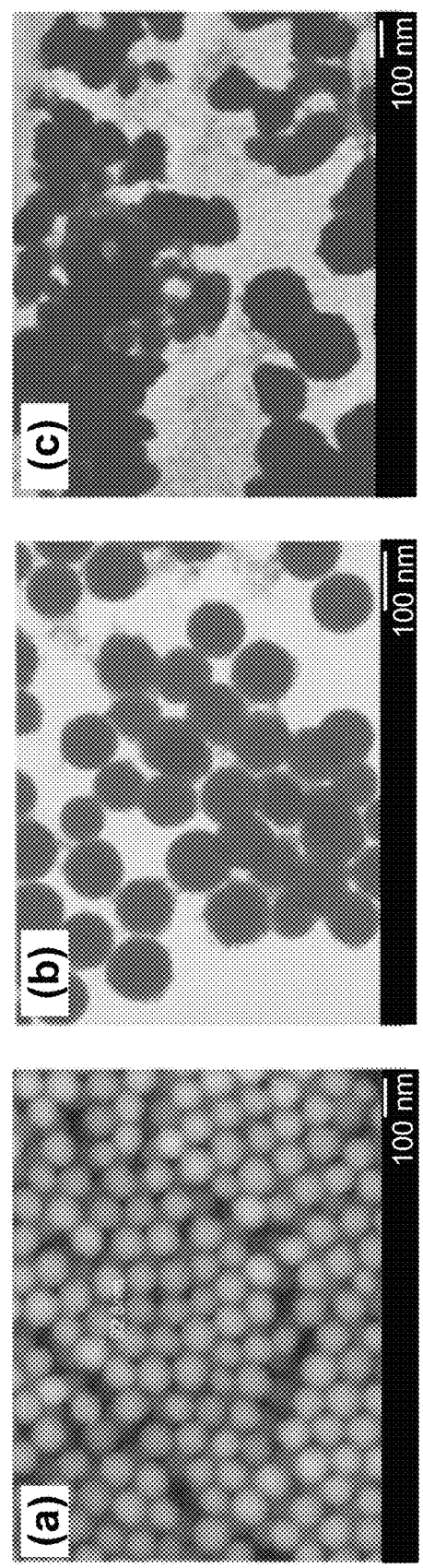
FIG. 17B is a series of scanning electron microscope (SEM) images of forming a layered shell particles, according to one embodiment. Part (a) shows core particles, part (b) shows core particles having a shell of one layer, part (c) shows core particles having a shell of at least two layers.

FIGS. 17A-17B depict an example of a layered shell particle engineered as a feedstock for using AM techniques for forming glass structures, according to one embodiment.

FIG. 17A is schematic drawing of a process 1700 of forming a layered shell particle. The core particle 1702 is a $SiO_2$ nanoparticle where a shell of $TiO_2$ layer 1704 is added to form a core-shell particle 1706. Then subsequent layers of alternating Si layers 1708 and Ti layers 1704 are added to the core-shell particle to that an onion structure of a layered shell particle 1710 having many alternating layers.

FIG. 17B is a series of SEM images of a suspension of layered shell particles at subsequent steps of preparation. Part (a) is an image of $SiO_2$ core particles 1702 (as drawn in FIG. 17A). Part (b) is an image of $SiO_2$—$TiO_2$ core-shell particles 1706, as depicted in FIG. 17A, having a $SiO_2$ core particle 1702 with a first shell of $TiO_2$ layer 1704. Part (c) is an image of the core-shell particles 1706 having a second layer of $SiO_2$ added on the $TiO_2$ layer.

Table 1 lists the average diameter values of each step of forming the layered shell particle, as represented in the images of FIG. 17B as determined by DLS.

TABLE 1

| DLS values of particles in suspension | | | |
|---|---|---|---|
| NP size | $SiO_2$ core | $SiO_2/TiO_2$ | $SiO_2/TiO_2/SiO_2$ |
| By DLS (nm) | 62.4 ± 0.1 | 66.9 ± 0.1 | 80.9 ± 0.1 |

As shown in Table 1, the average diameter of the particles increases as each layer is added to the $SiO_2$ core particle, thereby suggesting that the particles are growing in size as an additional layer is added.

Hollow Layered Shell Particles

Figure 18A:
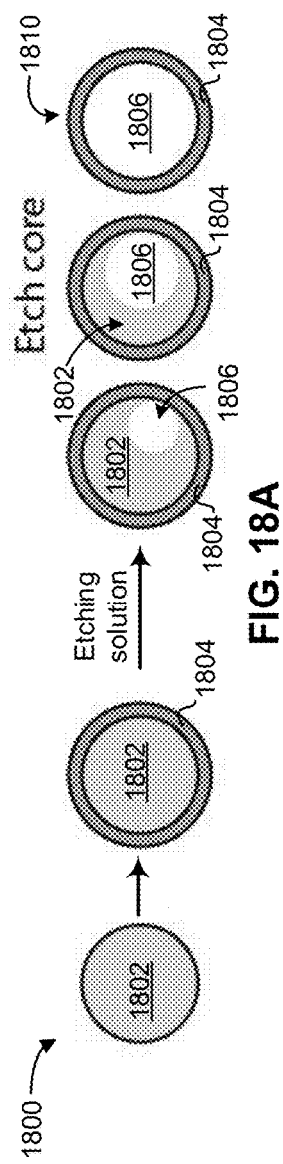
FIG. 18A is a schematic drawing of forming a hollow layered particle, according to one embodiment.
Figure 18B:
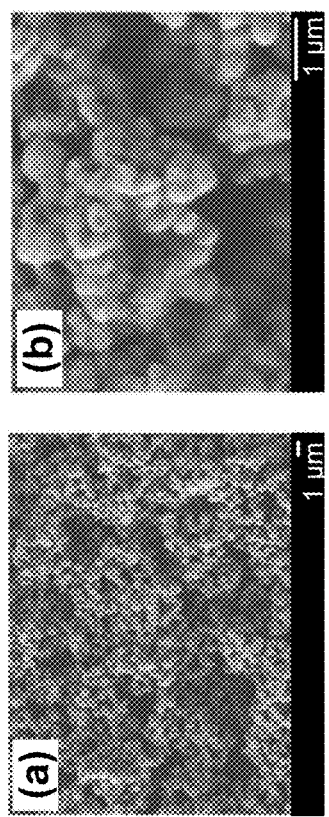
FIG. 18B is a series of transmission electron microscope (TEM) images of hollow layer particles, according to one embodiment. Part (a) is at lower magnification, and part (b) is at higher magnification.
Figure 18C:
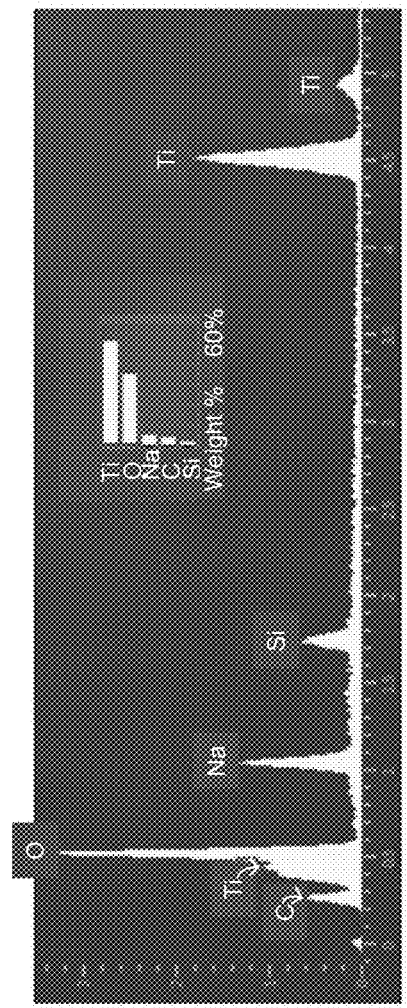
FIG. 18C is a plot of an energy dispersive X-ray (EDX) spectrum of hollow layer shell particles, according to one embodiment.

FIGS. 18A-18C depict an example of a hollow layered shell particle engineered as a feedstock for using AM techniques for forming glass structures, according to one embodiment. FIG. 18A is a schematic drawing of a process 1800 of forming a hollow layered shell particle. As described above in the process 1700 of forming a layered shell particle, the process 1800 begins with a $SiO_2$ core particle 1802 that has a $TiO_2$ shell 1804. An etching solution, e.g., NaOH, may be added to dissolve the $SiO_2$ core 1802 of the $SiO_2$—$TiO_2$ core-shell particles, thereby opening a hollow space 1806 in the core location of the core-shell particle. The etching may be stopped, quenched, etc. when the core material, in this case $SiO_2$, has dissolved and only a hollow space 1806 remains within the layered shells. In one approach, as shown in hollow layered shell particle 1810, a $TiO_2$ shell layer 1804 remains with a hollow space 1806. This approach is by way of example only, and not meant to be limiting in any way. The hollow layered shell particle may have a plurality of layers of different compositions.

FIG. 18B is a series of SEM images of hollow layered shell particles at a lower magnification (part (a)) and a higher magnification (part (b)).

FIG. 18C shows an energy dispersive X-ray (EDX) spectrum of the hollow layered shell particles that confirms the amount of Si is significantly lower than the amount of Ti and O in the particles, thereby suggesting that the core particle material has been removed from the particles.

In Use

Various embodiments described herein may be used to make active or passive optical glass components (e.g. lenses, corrector plates, windows, screens, collectors, waveguides, mirror blanks, sensors, etc.) with specialized compositions and material properties for both commercial or government applications. These methods may be used to introduce ions, molecules, or particles in arbitrary (i.e. custom) locations within the glass components (monoliths, films, or freeforms) to achieve spatially varying material properties within the glass, including: absorptivity, transmission, refractive index, dispersion, scatter, electrical conductivity, thermal conductivity, thermal expansion, gain coefficient, glass transition temperature (Tg), melting point, photoemission, fluorescence, chemical reactivity (e.g. etch rate), or density/porosity.

Various embodiments described herein provide methods for preparing intricate 3D and controlled color glass art, jewelry, etc. The control of the dopants of silver and gold nanoparticles allows control of the reflective and transmissivity properties of the art piece.

Further embodiments include active or passive optical glass components useful for lenses, corrector plates, windows, screens, collectors, waveguides, mirror blanks, sensors, etc., as well as non-optical glass components useful in conventional applications.

Various embodiments described herein as engineered feedstocks may be used for producing single or multi-component glasses of a variety of compositions using different additive manufacturing techniques. This would enable glasses for which there is currently no viable feedstock to be prepared via AM processes. The engineered feedstocks may be used for preparing glasses by additive manufacturing processes including direct ink writing, robocasting, computed axial lithography, projection microstereolithography, ink jet, electrophoretic deposition, and powder bed techniques such as selected laser melting/sintering or binder jetting. These AM-generated glasses may be used in a variety of applications including active and passive optics, packaging, labware, housewares, art and jewelry, glass seals, microfluidic and millifluidic devices, sensors, radiation shielding, bioglass, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An ink composition, comprising:
   a glass-forming material configured to be densified to a glass form,
   wherein the glass-forming material consists essentially of inorganic particles of a single composition; and
   a solvent.

2. The ink composition of claim 1, wherein the single composition is chosen from: fumed silica, colloidal silica, LUDOX colloidal silica dispersion, titania particles, zirconia particles, alumina particles, and metal chalcogenide particles.

3. The ink composition of claim 1, wherein the glass-forming material includes a silica polymer.

4. The ink composition of claim 1, further comprising an effective amount of a second component for altering a property of a glass structure created using the ink.

5. The ink composition of claim 4, wherein the second component affects the property chosen from: an optical characteristic, a mechanical characteristic, a magnetic characteristic, a thermal characteristic, an electrical characteristic, and a chemical characteristic.

6. The ink composition of claim 4, wherein the second component is a color altering component chosen from: metal nanoparticles, sulfur, metal sulfide, metal chloride, and metal oxide.

7. The ink composition of claim 4 wherein the second component is an absorptivity altering component chosen from: cerium oxide, iron, copper, chromium, silver, and gold.

8. The ink composition of claim 4, wherein the second component is a refractive index altering component chosen from: titanium, zirconium, aluminum, lead, thorium, barium.

9. The ink composition of claim 4, wherein the second component is a dispersion altering component chosen from: barium and thorium.

10. The ink composition of claim 4, wherein the second component is an attenuation and/or optical density altering component chosen: an alkaline metal and an alkaline earth metal.

11. The ink composition of claim 4, wherein the second component is a photosensitivity altering component chosen from: silver, cerium, and fluorine.

12. The ink composition of claim 4, wherein the second component is an electrical conductivity altering component chosen from: alkali metal ions, fluorine, and carbon nanotubes.

13. The ink composition of claim 4, wherein the second component is a birefringence altering component chosen from: titanium, zirconium, zinc, niobium, strontium, lithium, in combination with silicon and oxygen.

14. The ink composition of claim 4, wherein the second component is a thermal conductivity altering component chosen from: a metal and carbon nanotubes.

15. The ink composition of claim 4, wherein the second component is a thermal emissivity altering component chosen from: tin oxide and iron.

16. The ink composition of claim 4, wherein the second component is a thermal expansion altering component chosen from: boron oxide and titanium oxide.

17. The ink composition of claim 4, wherein the second component is sodium carbonate for altering a glass transition temperature of the glass structure.

18. The ink composition of claim 4, wherein the second component is a melting point altering component chosen from: sodium, aluminum, and lead.

19. The ink composition of claim 4, wherein the second component is a gain coefficient altering component chosen from: rare earth ions and transition metal ions.

20. The ink composition of claim 4, wherein the second component affects a property chosen from: photoemission, luminescence, and fluorescence.

21. The ink composition of claim 4, wherein the second component is a chemical reactivity altering component chosen from: an alkaline metal, an alkaline earth metal, and silver.

22. The ink composition of claim 4, wherein the second component is a density altering component chosen from: titanium, zirconium, aluminum, lead, thorium, and barium.

23. The ink composition of claim 1, further comprising an effective amount of an additive for causing an effect chosen from: enhancing dispersion, enhancing phase stability, enhancing network strength, controlling pH, changing pH, modifying rheology, reducing crack formation during drying, inhibiting crystallization, and aiding in sintering.

24. The ink composition of claim 1, further comprising an effective amount of an additive for enhancing dispersion, the additive being chosen from: a surfactant, a polyelectrolyte, and an inorganic acid.

25. The ink composition of claim 1, further comprising an effective amount of an additive for enhancing phase stabilization.

26. The ink composition of claim 1, further comprising an effective amount of an additive for inhibiting crystallization, the additive being chosen from: $B_2O_3$, $Al_2O_3$ and $Ga_2O_3$.

27. The ink composition of claim 1, wherein the glass-forming material is present in the range of about 5 vol % to about 50 vol % based on a total volume of the ink composition, the solvent is present in the range of about 30 vol % to about 95 vol % based on the total volume of the ink composition; and further comprising one or more second components present in the range of 0 wt % to about 20 wt % based on the total volume of the ink composition; and one or more additives present in the range of from 0 wt % to about 10 wt % based on the total volume of the ink composition.

28. The ink composition of claim 1, wherein the glass-forming material includes an inorganic polymer.

29. The ink composition of claim 1, wherein the ink is configured to be printed into a low density form having the glass-forming material and densified into a glass form.

30. The ink composition of claim 29, wherein the low density form is porous and amorphous.

31. The ink composition of claim 1, wherein the ink is configured to be printed and densified into a glass form.

32. The ink composition of claim 1, wherein the composition is configured to form a three-dimensional structure that is self-supporting.

33. The ink composition of claim 1, wherein the composition is a resin for a stereolithography printing technique.

34. The ink composition of claim 1, wherein the composition is an ink for an extrusion-based additive manufacturing process.

35. The ink composition of claim 1, wherein the composition is a powder for a laser melting additive manufacturing process.

36. An ink composition comprising:
a glass-forming material; and
a solvent, wherein-the glass-forming material includes intermixed particles, wherein an average diameter of the intermixed particles is in a range of about 100 nanometers to about 400 nanometers.

37. The ink composition of claim 36, wherein the glass-forming material includes a silica-germanium oxide polymer.

38. The ink composition of claim 36, wherein the glass-forming material includes a metal-containing organic precursor and/or a metal-containing inorganic precursor.

39. The ink composition of claim 38 wherein the precursor is chosen from: metalalkoxides, siloxanes, silicates, phosphates, chalcogenides, metal-hydroxides, metal salts.

40. The ink composition of claim 36, wherein the glass-forming material includes blended particles having the intermixed particles and at least one other type of particle having a different composition than the intermixed particles,
wherein the at least one other type of particle is chosen from: core-shell particles, particles having a single composition, layered shell particles having an onion structure comprising layers of different compositions, hollow layered shell particles including a hollow space in core locations, core-shell particles with an intermixed core, and layered shell particles with an intermixed core.

41. The ink composition of claim 40, wherein the blended particles include silica lead oxide.

42. The ink composition of claim 40, wherein the at least one other type of particle is a core-shell particle.

43. The ink composition of claim 42, wherein an average diameter of a core particle of the core-shell particles is in a range of about 25 nanometers to about 200 nanometers.

44. The ink composition of claim 42, wherein an average thickness of a shell of the core-shell particles is in a range of about 2 nanometers to about 4 nanometers.

45. The ink composition of claim 36, wherein the glass-forming material includes a combination particle having a core being an intermixed particle and at least one feature chosen from: a shell, a layered shell, and an inorganic polymer.

46. The ink composition of claim 36, wherein the glass-forming material includes a polymer.

47. The ink composition of claim 36, wherein the glass-forming material includes a silica-containing polymer.

48. The ink composition of claim 36, wherein the ink is configured to be printed into a low density form having the glass-forming material and densified into a glass form.

49. The ink composition of claim 48, wherein the low density form is porous and amorphous.

50. The ink composition of claim 36, wherein the composition is configured to form a three-dimensional structure that is self-supporting.

51. The ink composition of claim 36, wherein the composition is a resin for a stereolithography printing technique.

52. The ink composition of claim 36, wherein the composition is an ink for an extrusion-based additive manufacturing process.

53. The ink composition of claim 36, wherein the composition is a powder for a laser melting additive manufacturing process.

54. The ink composition of claim 36, wherein the inter-mixed particles comprise clusters of oligomer-based particles, each inter-mixed particle comprising at least two different chemical species.

55. The ink composition of claim 36, further comprising an effective amount of a second component for altering a property of a glass structure created using the ink.

56. The ink composition of claim 55, wherein the second component affects a property chosen from: an optical characteristic, a mechanical characteristic, a magnetic characteristic, a thermal characteristic, an electrical characteristic, and a chemical characteristic.

57. An ink composition comprising:
a glass-forming material; and
a solvent,
wherein the glass-forming material includes layered shell particles,
wherein each layered shell particle includes at least two shell layers above a core particle, wherein one of the at least two shell layers has a different composition than the other of the at least two shell layers.

58. The ink composition of claim 57, wherein the layered shell particles include silica-germanium oxide particles.

59. The ink composition of claim 57 wherein the glass-forming material includes hollow layered shell particles.

60. The ink composition of claim 57, wherein the ink is configured to be printed and densified into a glass form.

61. The ink composition of claim 57, wherein the ink is configured to be printed into a low density form having the glass-forming material and densified into a glass form.

62. The ink composition of claim 61, wherein the low density form is porous and amorphous.

63. The ink composition of claim 57, wherein the composition is configured to form a three-dimensional structure that is self-supporting.

64. The ink composition of claim 57, wherein the composition is a resin for a stereolithography printing technique.

65. The ink composition of claim 57, wherein the composition is an ink for an extrusion-based additive manufacturing process.

66. The ink composition of claim 57, wherein the composition is a powder for a laser melting additive manufacturing process.

67. The ink composition of claim 57, further comprising an effective amount of a second component for altering a property of a glass structure created using the ink.

68. The ink composition of claim 67, wherein the second component affects a property chosen from: an optical characteristic, a mechanical characteristic, a magnetic characteristic, a thermal characteristic, an electrical characteristic, and a chemical characteristic.

69. The ink composition of claim 67, wherein the second component is a color altering component chosen from: metal nanoparticles, sulfur, metal sulfide, metal chloride, and metal oxide.

* * * * *